(12) United States Patent
Wicker et al.

(10) Patent No.: US 7,556,490 B2
(45) Date of Patent: Jul. 7, 2009

(54) MULTI-MATERIAL STEREOLITHOGRAPHY

(75) Inventors: Ryan Wicker, El Paso, TX (US);
Francisco Medina, El Paso, TX (US);
Christopher Elkins, Redwood City, CA (US)

(73) Assignee: Board of Regents, the University of Texas System, Austin, TX (US)

( * ) Notice: Subject to any disclaimer, the term of this patent is extended or adjusted under 35 U.S.C. 154(b) by 909 days.

(21) Appl. No.: 10/903,379

(22) Filed: Jul. 30, 2004

(65) Prior Publication Data

US 2006/0022379 A1 Feb. 2, 2006

(51) Int. Cl.
*B28B 1/16* (2006.01)
*B29C 35/08* (2006.01)
(52) U.S. Cl. .................. 425/375; 425/174.4; 264/113; 264/401
(58) Field of Classification Search .............. 425/174.4, 425/375; 264/308, 401, 113, 497
See application file for complete search history.

(56) References Cited

U.S. PATENT DOCUMENTS

| | | | |
|---|---|---|---|
| 4,575,330 A | 3/1986 | Hull | |
| 4,942,001 A | 7/1990 | Murphy et al. | 264/22 |
| 5,088,047 A | 2/1992 | Bynum | |
| 5,143,663 A * | 9/1992 | Leyden et al. | 264/401 |
| 5,398,193 A | 3/1995 | deAngelis | |
| 5,402,351 A | 3/1995 | Batchelder et al. | 364/468 |
| 5,510,066 A | 4/1996 | Fink et al. | |
| 5,658,412 A | 8/1997 | Retallick et al. | 156/272.8 |
| 5,779,967 A * | 7/1998 | Hull | 264/401 |
| 5,786,023 A | 7/1998 | Maxwell et al. | |
| 5,876,550 A * | 3/1999 | Feygin et al. | 156/264 |
| 5,902,538 A | 5/1999 | Kruger et al. | |

(Continued)

FOREIGN PATENT DOCUMENTS

DE 29907262 U1 * 8/1999 .............. 425/174.4

(Continued)

OTHER PUBLICATIONS

Baldwin, Samuel P. et al; "Materials For Protien Delivery in Tissue Engineering", Advanced Drug Delivery Reviews 33, 1998 Elsevier Science B.V., p. 71-86.

(Continued)

*Primary Examiner*—Maria Veronica D Ewald
(74) *Attorney, Agent, or Firm*—Fulbright & Jaworski LLP

(57) ABSTRACT

Methods and systems of stereolithography for building cost-efficient and time-saving multi-material, multi-functional and multi-colored prototypes, models and devices configured for intermediate washing and curing/drying is disclosed including: laser(s), liquid and/or platform level sensing system(s), controllable optical system(s), moveable platform(s), elevator platform(s), recoating system(s) and at least one polymer retaining receptacle. Multiple polymer retaining receptacles may be arranged in a moveable apparatus, wherein each receptacle is adapted to actively/passively maintain a uniform, desired level of polymer by including a recoating device and a material fill/remove system. The platform is movably accessible to the polymer retaining receptacle(s), elevator mechanism(s) and washing and curing/drying area(s) which may be housed in a shielded enclosure(s). The elevator mechanism is configured to vertically traverse and rotate the platform, thus providing angled building, washing and curing/drying capabilities. A horizontal traversing mechanism may be included to facilitate manufacturing between components of SL cabinet(s) and/or alternative manufacturing technologies.

32 Claims, 12 Drawing Sheets

U.S. PATENT DOCUMENTS

| | | | |
|---|---|---|---|
| 6,027,699 | A | 2/2000 | Holcomb et al. |
| 6,153,034 | A | 11/2000 | Lipsker |
| 6,158,346 | A | 12/2000 | Zhang |
| 6,159,411 | A | 12/2000 | Kulkarni et al. |
| 6,179,601 | B1 | 1/2001 | Kruger et al. |
| 6,206,672 | B1 | 3/2001 | Grenda |
| 6,216,765 | B1 | 4/2001 | Tseng et al. |
| 6,242,163 | B1 | 6/2001 | Stampfl et al. |
| 6,309,581 | B1 | 10/2001 | Gervasi |
| 6,372,178 | B1 | 4/2002 | Tseng ............... 264/656 |
| 6,391,251 | B1 | 5/2002 | Keicher et al. |
| 6,450,393 | B1 | 9/2002 | Doumanidis et al. |
| 6,492,651 | B2 | 12/2002 | Kerekes ............. 250/559.2 |
| 6,549,710 | B2 | 4/2003 | Simmons et al. ....... 385/121 |
| 6,623,687 | B1 | 9/2003 | Gervasi et al. |
| 6,630,093 | B1 | 10/2003 | Jones |
| 6,641,897 | B2 | 11/2003 | Gervasi |
| 6,706,234 | B2 | 3/2004 | Huang .................. 264/435 |
| 6,752,948 | B2* | 6/2004 | Newell et al. ........... 264/234 |
| 6,847,774 | B2 | 1/2005 | Simmons et al. ......... 385/134 |
| 6,849,223 | B2 | 2/2005 | Dean et al. .............. 264/400 |
| 6,998,017 | B2 | 2/2006 | Lindsay et al. .......... 162/109 |
| 7,229,144 | B2 | 6/2007 | Nielsen et al. ............. 347/2 |
| 7,419,630 | B2 | 9/2008 | Palmer et al. ........... 264/401 |
| 2002/0171178 | A1 | 11/2002 | Dean et al. |
| 2002/0195747 | A1* | 12/2002 | Hull et al. .............. 264/401 |
| 2003/0032733 | A1 | 2/2003 | Fisher et al. |
| 2004/0006438 | A1 | 1/2004 | Hastert et al. |
| 2005/0169962 | A1 | 8/2005 | Bhatia et al. ........... 435/173.1 |
| 2005/0263932 | A1* | 12/2005 | Heugel ................. 264/113 |
| 2006/0225834 | A1 | 10/2006 | Medina et al. .......... 425/174.4 |
| 2006/0237880 | A1 | 10/2006 | Wicker et al. ........... 264/401 |

FOREIGN PATENT DOCUMENTS

| | | |
|---|---|---|
| EP | 1245369 | 2/2002 |
| WO | WO 02/085246 | 10/2002 |
| WO | WO 03/002490 | 1/2003 |

OTHER PUBLICATIONS

Kataria Alok et al; "Building Around Inserts: Methods For Fabricating Complex Devices In Stereolithography" DETC00/MECH-14206; 2000 ASME, p. 1-11.

Maruo Shoji et al; Multi-Polymer Microstereolithography For Hybrid Opto-Mems; Department of Micro System Engineering, Nagoya University, 2001 IEEE, p. 151-154.

Lee Jim H. et al; "Cure Depth In Photopolymerization: Experiments and Theory", J. Mater. Res., vol. 16, No. 12, Dec. 2001; p. 3536-3544; 2001 Materials Research Society.

Hoffman Allan S.; "Hydrogels For Biomedical Applications", Advanced Drug Delivery Reviews 43 (2002); 2002 Elsevier Science B.V., Jul. 26, 2001, p. 3-12.

Cooke Malcolm N. et al; "Use of Stereolithography to Manufacture Critical-Sized 3D Biodegradable Scaffolds for Bone Ingrowth" 2002 Wiley Periodicals, Inc., Oct. 2001.

Liu Valerie A. et al; "Three Dimensional Photopatterning of Hydrogels Containing Living Cells", Hybrid Bio/Artificial Microdevices, Biomedical Microdevices 4:4; 2002 p. 257-26.

De Laurentis Kathryn J. et al; "Procedure For Rapid Fabrication Of Non-Assembly Mechanisms With Embedded Components" DETC 2002/MECH-34350; 2000 ASME, p. 1-7.

Hatanaka Motohide et al; "Process Planning For Embdding Flexible Materials in Multi-material Prototypes" DETC2003/DFM048166, 2003 ASME, p. 1-9.

Drury Jeanie L. et al; "Hydrogels For Tissue Engineering: Scaffold Design Variables and Applications", Science Direct, Biomaterials, 2003 Elsevier Ltd., p. 1-15.

Geving Brad et al; "Conceptual Design Of A Generalized Stereolithography Machine", The George W. Woodruff School of Mechanical Engineering, pp. 1-8.

De Laurentis Kethryn J. et al; "Rapid Fabrication of Non-Assembly Robotic Systems With Embedded Components", Robotics and Mechatronics Laboratory; Rutgers University, pp.1-30.

Dhariwalia et al., "Rapid prototyping of tissue-engineering constructs, using photopolymerizable hydrogels and stereolithography," *Tissue Engineering*, 10(9-10):1316-1322, 2004.

Hadlock et al., "A polymer foam conduit seeded with Schwann cells promotes guided peripheral nerve regeneration," *Tissue Engineering*, 6(2):119-127, 2000.

Heath and Rutkowski, "The development of bioartificial nerve grafts for peripheral-nerve regeneration," *Tibtech*, 16:163-168, 1998.

Office Action issued in U.S. Appl. No. 10/907,984, mailed Sep. 3, 2008.

Office Action issued in U.S. Appl. No. 11/095,120, mailed Aug. 1, 2008.

Office Action issued in U.S. Appl. No. 11/095,120, mailed Nov. 5, 2008.

Sundback et al., "Manufacture of porous polymer nerve conduits by a novel low-pressure injection molding process," *Biomaterials*, 24:819-830, 2003.

U.S. Appl. No. 12/181,486 entitled "Methods and Systems for Rapid Prototyping of High Density Circuits," by Jeremy A. Palmer et al., filed Jul. 29, 2008.

* cited by examiner

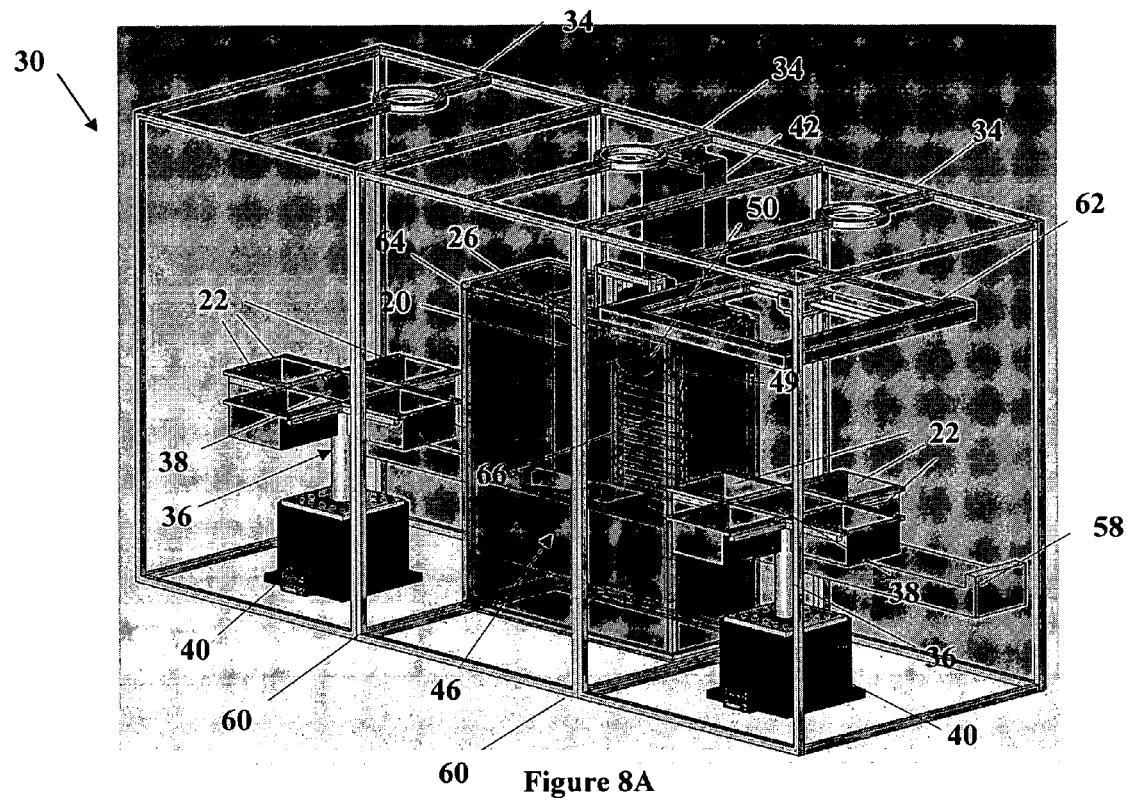
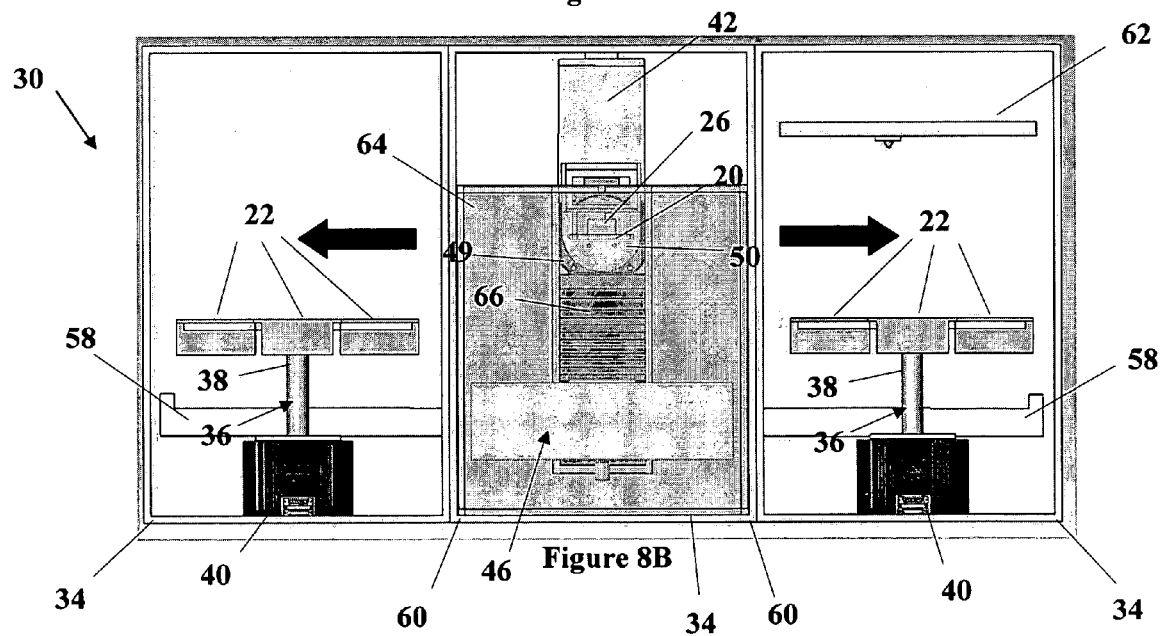

MULTI-MATERIAL STEREOLITHOGRAPHY

BACKGROUND

The present invention relates to the general field of rapid prototyping technology, and in particular, to stereolithography methods and systems.

Rapid prototyping (RP) technologies, also known as Solid Freeform Fabrication (SFF), layered manufacturing and other similar technologies enable the manufacture of complex three-dimensional (3D) parts. RP technologies, in particular, generally construct parts by building one layer at a time. RP technologies are commonly used to build parts and prototypes for use in, for example, the toy, automotive, aircraft and medical industries. Oftentimes prototypes made by RP technologies aid in research and development and provide a low cost alternative to traditional prototyping. In a few cases, RP technologies have been used in medical applications such as those associated with reconstructive surgery and tissue engineering (TE).

Stereolithography (SL) is one of the most widely used RP technologies known in the art. The resolution of SL machines and the ability of SL to manufacture highly complex 3D objects, make SL ideal for building both functional and non-functional prototypes. In particular, SL techniques provide an economical, physical model of objects quickly and prior to making more expensive finished parts. The models are readily customizable and changes may be easily implemented.

SL generally involves a multi-stage process. For example, the first stage involves designing and inputting a precise mathematical geometric description of the desired structure's shape into one of many computer-aided design (CAD) programs and saving the description in the standard transform language (STL) file format. In the second stage, the STL file is imported into SL machine-specific software (RP software). The RP software slices the design into layers and determines the placement of support structures to hold each cross-section in place while building the structure layer by layer. By computing build parameters, the RP software controls the part's fabrication. In the layer preparation stage, the build parameters for the desired part are translated into machine language. Finally, the machine language controls the SL machine to build a desired part and its support structure layer by layer. SL machines typically focus an ultraviolet (UV) laser onto a cross-section of a liquid photopolymer resin. The laser, in turn, selectively cures a resin to form a structure, such as anatomical shapes (i.e., organs and tissues), layer by layer. Ultimately, the part is cleaned, the support structure is removed and the part is post-cured (typically exposed to UV) prior to completion.

SL technologies known in the art generally include, for example, a laser, a liquid level sensing system, laser beam optics and controllable mirror system, a vertically movable platform, single resin retaining receptacle or vat and a recoating device. During the laser scanning phase, a series of optics and controllable mirrors raster a UV laser beam to solidify a photocurable polymer resin. The subject 3D part is first attached to the platform by building a support structure with the platform in its topmost position. This step allows for misalignment between the platform and the surface of the liquid resin—once constructed, the base support structure is parallel with the surface of the liquid. When building the subject part simultaneously with its required support structure and after the laser beam completes a layer, the platform typically is vertically traversed downward a distance equal to the build layer thickness. After the platform is vertically traversed downward and prior to selectively curing the next layer, a recoating device is typically traversed horizontally across the part that deposits a uniform layer of liquid polymer across the part. The recoating device ensures that trapped spaces within the part are filled with liquid resin (which may be required for future build layers), and is used to maintain a constant build layer thickness. The process repeats as each layer is built. Complex-shaped parts are thus manufactured by repeating the layering process. Once complete, the part is typically raised out of the liquid polymer, the support structure is removed from the part and the part is cleaned and then post-cured. The operator may, however, need to sand, file or use some other finishing technique on the part in order to provide a specific surface finish to the structure, which may include painting, plating and/or coating the surface.

TE techniques, in particular, rely on necessary fluids, growth factors and cells to perfuse through the pores of a scaffold (a supporting structural and potentially bioactive framework used in tissue engineering for directed cell growth). One of the most challenging problems in TE involves promoting cell in-growth and perfusion to seeded cells in implanted scaffolds. The diffusion of oxygen and nutrients is not sufficient to sustain cell viability beyond distances of approximately 100 microns in the body. TE techniques, therefore, must retain precise control over the resulting 3D geometry to design favorable perfusion into a scaffold thus maintaining cell viability. SL technologies allow direct manufacturing of perfusion promoting implantable scaffolds. Hydrogels are biocompatible materials that exhibit favorable perfusion characteristics and are currently used in photolithographic processes using manual lithographic masking techniques as well as a variety of other processes. Implantable multi-material hydrogel constructs, however, are not currently suited for single material SL machines known in the art.

Accordingly, improvements in part building technology are desired. Specifically, there is a need for a low cost, efficient and easy to use stereolithography system that accommodates multiple building materials or resins. What is desired is a system that maintains a non-contaminating and sterile building environment while accommodating intermediate cleaning and curing between materials and/or resins. For example, when building biomedical implantable structures and/or devices, it is imperative to maintain a sterile building environment. It is equally important that resin or resin residue from one portion of the build does not contaminate any other resin when building with multiple materials, and thus, intermediate washing between materials is a critical element of the desired system. What is also desired is a multiple resin system to directly manufacture complex multiple-material, functional and non-functional prototypes and finished devices. What is further desired is an SL system that accommodates building multiple material, implantable hydrogel structures and other microstructures. What is still further desired is an SL system that allows additives, such as color (pigments, dyes and other color additives known in the art), to incorporate into resins on a layer by layer basis. Still another desire is to have a system that allows other resin additives and/or other materials (as in part embedding or cell seeding) to alter characteristics, such as the strength, mechanical, optical, thermal, electrical, functional and biofunctional properties of the resin and/or resulting model on a layer by layer basis or even within a single layer.

SUMMARY OF THE INVENTION

The present invention overcomes the aforementioned limitations in an effective and efficient manner, thus expanding the use of RP in various applications and improves SL functionality. The present invention, for example, also provides improvements in vat and platform exchange, material isolation, material fill/removal, material level sensing and control, intermediate washing and rinsing, intermediate post-curing/drying and incorporating material and/or resin additives on a layer by layer basis or within a single layer. The present invention provides these improvements while maintaining a sterile and non-contaminating building environment. For example, when building multi-material functional and non-functional structures and/or devices, it is imperative to eliminate the contamination of materials and/or resins between retaining receptacles. It is further imperative when building biomedical implantable structures and/or devices to maintain a sterile building environment.

The present invention provides, for example, multiple polymer retaining receptacles or vats in a stacked system, a fixed vat system or a carousel system, as examples, designed to accommodate multi-material fabrication of a part. The numerous materials compatible with use in the present invention include, for example, polymers that are photocurable using an ultra-violet (UV) light source with a wavelength compatible with current SL machines. Other suitable polymers and materials are described herein. In one embodiment of the present invention, each vat is easily exchangeable and is connected to a pump system. A pump system fills and removes polymers from individual vats and facilitates the exchange of materials, if necessary, while maintaining a sterile building environment.

The present invention also provides a platform system which transports the subject part from one area of the SL machine to another or between two or more SL machines. For example, the platform system may transport a subject part for intermediate washing and rinsing in the washing unit and then post-curing/drying (or intermediate curing/drying) in the curing/drying unit. The intermediate curing capability allows for any uncured material to be cured and/or dried prior to immersing the platform with the subject part in the next material, thus, providing sterile multi-material fabrication on a layer by layer basis or within a single layer.

One embodiment of the present invention further provides a platform system which may be rotated during the washing and/or curing/drying cycles to facilitate angled washing and curing/drying. The platform provides, for example, the ability to rotate and position itself, within the washing and curing/drying unit. Because the platform is further designed to provide a sealed enclosure, overspray from the washing area and curing/drying unit is eliminated. The platform is further adapted to rotate at any angle during the building processes. Thus, the present invention facilitates angled part building, washing, curing and drying (about a horizontal axis).

The present invention significantly decreases overall build times for multiple material applications. Thus, for example, the present invention has the potential to maintain cell viability and increase flexibility for 3D complexity required by real tissue generation applications. The present invention also provides improvements in implantable complex-shaped, multi-material curable polymer constructs which may now be directly manufactured for implantation and facilitate TE for organs and tissues.

The present invention may be retrofitted into existing stereolithography technology and aid in the manufacturing of 3D multi-material functional and non-functional prototypes and devices, or it can be introduced as a new technology incorporating the inventive concepts described herein. For example, one embodiment of the SL machine may include a single vat, an enclosed stationary washing area with a curing/drying unit, a movable platform, an elevator mechanism with optional platform rotation mechanism, an optional alternative manufacturing apparatus and a horizontal traversing unit configured to access each of the above-listed components of the SL machine.

As another example, an alternative embodiment of the SL machine may include two single vats, an enclosed stationary washing area with a curing/drying unit, a movable platform, an elevator mechanism with optional platform rotation mechanism, an optional alternative manufacturing apparatus and a horizontal traversing unit configured to access each of the above-listed components of the SL machine.

As yet another example, an alternative embodiment of the SL machine may include a single rotatable vat apparatus (a vat carousel apparatus), a stationary washing area with a curing/drying unit, a movable platform, an elevator mechanism with optional platform rotation mechanism, an optional alternative manufacturing apparatus and a horizontal traversing unit configured to access each of the above-listed components of the SL machine.

As still another example, an alternative embodiment of the SL machine may include two rotatable vat apparatuses (vat carousel apparatuses) separated by an enclosed stationary washing area with a curing/drying unit, a movable platform, an elevator mechanism with optional platform rotation mechanism, an optional alternative manufacturing apparatus and a horizontal traversing unit configured to access each of the above-listed components of the SL machine.

As still one more example, an alternative embodiment of an SL machine may include a rotatable vat apparatus (a vat carousel apparatus), an enclosed stationary washing area with curing/drying unit, two movable platforms, optional alternative manufacturing apparatuses and a dual-sided elevator mechanism with one or more optional platform rotation mechanisms configured to access each of the above-listed components of the SL machine.

The present invention may also aid in designing new stereolithography applications and thus provides expanded opportunities for manufacturing multi-material products using RP, while providing a cost effective and easy to implement system. For example, the present invention still further provides an SL system that allows additives, such as color, to incorporate into resins on a layer by layer basis or within a single layer. Thus, the present invention, for example, facilitates multi-colored SL. The present invention also accommodates other resin additives, such as those that alter characteristics relating to the strength, mechanical, optical, thermal, electrical, functional and/or biofunctional properties of the resin, on a layer by layer basis or within a single layer. For example, a given part may be made of a single material, but have portions of the part constructed with an additive incorporated into that material. For example, the additive may be rigid, encapsulated gas or some other material that may or may not be photocurable with UV. The additive may require some other type of curing mechanism. For example, the additive may be a thermally curable material.

The present invention also facilitates interfacing with other manufacturing technologies. For example, manufacturing technologies may include such technologies as Computer Numerical Control (CNC) machining and ink jet printing (such as those used to print polymers, curable inks and/or proteins, as examples). Thus, the given part may be designed to exhibit different material properties at any given location. The present invention thus provides endless combinations of multi-material and multi-colored construction and significant improvements in numerous applications requiring complex, three-dimensional, functional and non-functional prototyping or finished products.

The present invention still further provides methods and systems for multi-layered and multi-material manufacturing using, for example, hydrogel solutions in existing SL RP machines. These methods and systems require software and hardware to, for example: (1) interface with the existing RP technology; (2) maintain the biocompatibility of the hydrogel solution; (3) determine the optimum SL machine parameters for successfully manufacturing hydrogel constructs with or without living cells and bioactive elements; and (4) develop the processes required for multi-material construction both within and across build layers. The present invention will accommodate these needs and provide further improvements in TE, chemical sensing, biological sensing and numerous other applications requiring complex, three-dimensional, multi-material, multi-element and/or multi-color manufacturing. The present invention, for example, further provides a multi-material SL system that builds angiogenic structures or roadways between proliferative structures for use in, for example, guided angiogenesis to restore vascular function.

BRIEF DESCRIPTION OF THE DRAWINGS

The above and further advantages of the invention may be better understood by referring to the following description in conjunction with the accompanying drawings, in which:

FIG. 8A is a perspective view of another alternative embodiment of an SL machine in accordance with the present invention shown with two rotatable vat apparatuses separated by an enclosed stationary washing area with a curing/drying unit, a movable platform, an elevator mechanism with an optional platform rotation mechanism, an optional alternative manufacturing apparatus and a horizontal traversing unit configured to access each of the above-listed components of the SL machine;

FIG. 8B is another perspective view of the alternative embodiment shown in FIG. 8A;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
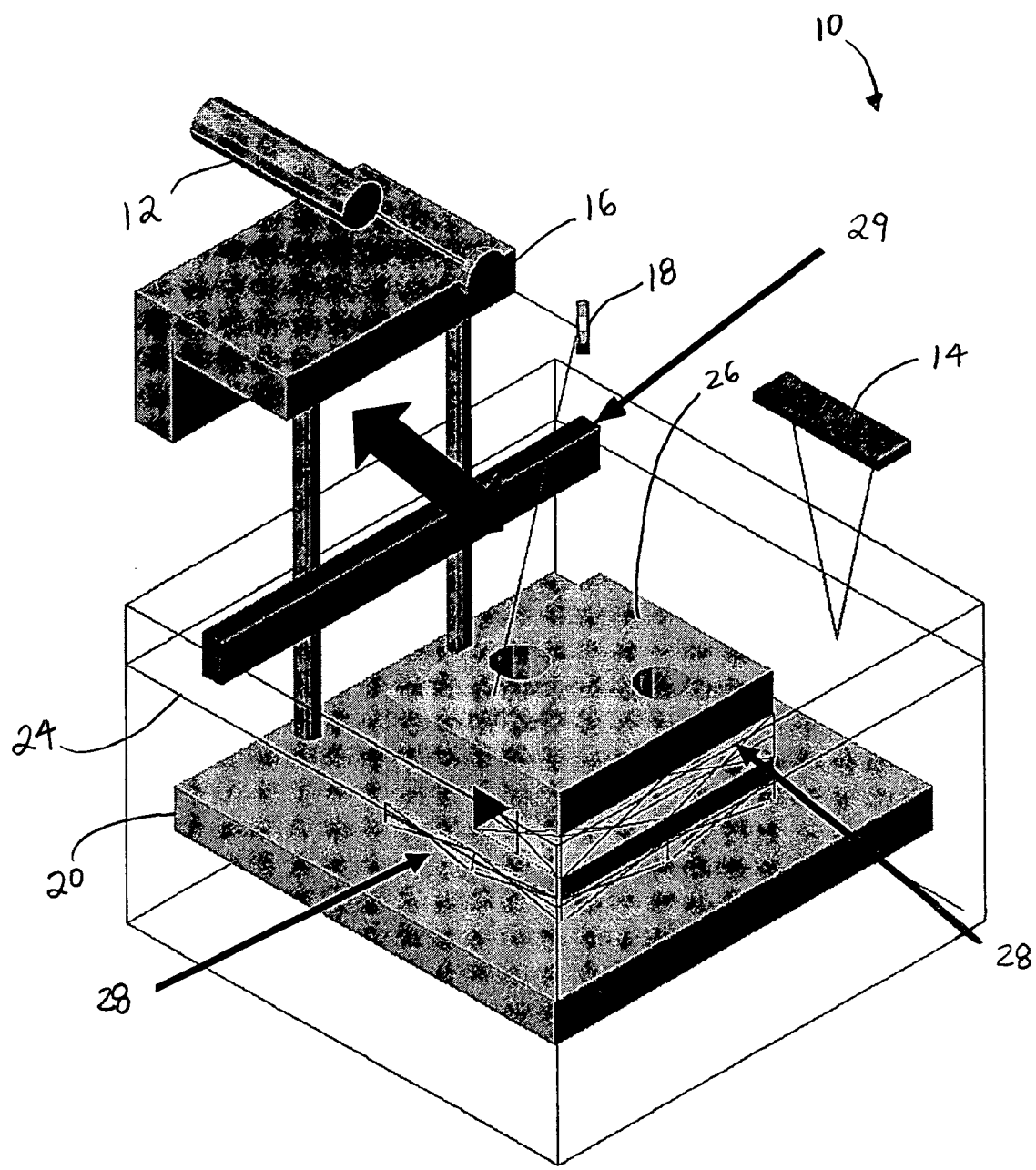
FIG. 1 is an illustration of a prior art SL machine.

A typical prior art SL machine 10, as illustrated in FIG. 1, generally includes a UV laser beam 12, a liquid level sensing system 14, optics 16 and controllable mirror system 18, a vertically movable platform 20 and a resin retaining receptacle or vat 22. The vat 22 houses a liquid photocurable polymer resin 24 and, generally, the SL machine 10 rasters a UV laser beam 12 across the resin through a series of optics 16 and a controllable mirror system 18. In most designs, the subject three-dimensional (3D) part 26 is usually first attached to the platform 20 by building a base support structure 28 while the platform 20 is still in its topmost position. The support structure 28 is usually made up of fine filaments that support the subject part's 26 overhangs and are manufactured simultaneously using the same resin 24. Prior art designs typically incorporate a recoating device, recoating blade or other sweeping device 29 that sweeps or horizontally translates across the surface of the liquid after the platform 20 and subject part 26 have been traversed downward a distance equal to the build layer thickness. Thus, the recoating device 29 facilitates uniform liquid layers on the surface of the subject part 26 and eliminates trapped gases or bubbles and/or trapped volumes left on or underneath the platform 20 and/or the subject part 26 both before and during the building process.

Referring still to the prior art SL machine 10 depicted in FIG. 1, after the SL machine 10 rasters the UV laser beam 12 and completes a given layer (which also includes waiting a sufficient time for the reaction to finish after the laser beam has completed its scan), the platform 20 is vertically traversed downward a distance equal to the build layer thickness typically between by not limited to 2 and 6 mils or optionally traversed downward a distance greater than the build layer thickness in order to dip the subject part 26 into the resin 24 and fill any internal part cavities. Once dipping the subject part 26 is completed, if dipping is optionally performed, the platform 20 is then traversed upward until the platform is located a distance equal to the build layer thickness from the surface of the resin 24. The build layer thickness usually depends on the type of build desired. Prior to beginning a new reaction with the laser 12, a recoating device 29 typically traverses the liquid resin 24 surface as described previously, and the SL machine 10 waits a prescribed amount of time for the liquid resin to reach a state of equilibrium (so that essentially all waves and any other movement of the liquid resin has stopped) prior to starting the next layer. The process repeats as each layer is built. Complex-shaped parts are thus manufactured by repeating the layering process. Once complete, the subject part 26 is typically raised out of the liquid polymer resin 24, the support structures 28 are removed and the subject part 26 is cleaned and post-cured, usually in a UV oven (not shown). However, it should be understood that support structures 28 may be removed before, during, and/or after the cleaning and curing/drying processes. Prior art SL machines 10, thus, limit building a subject part 26 to one material or, for example, a liquid photopolymer resin 24. What is desired is an SL system that readily allows building 3D models from different materials using the same apparatus and allows sweeping between layers of multi-material 3D models.

Figure 2:
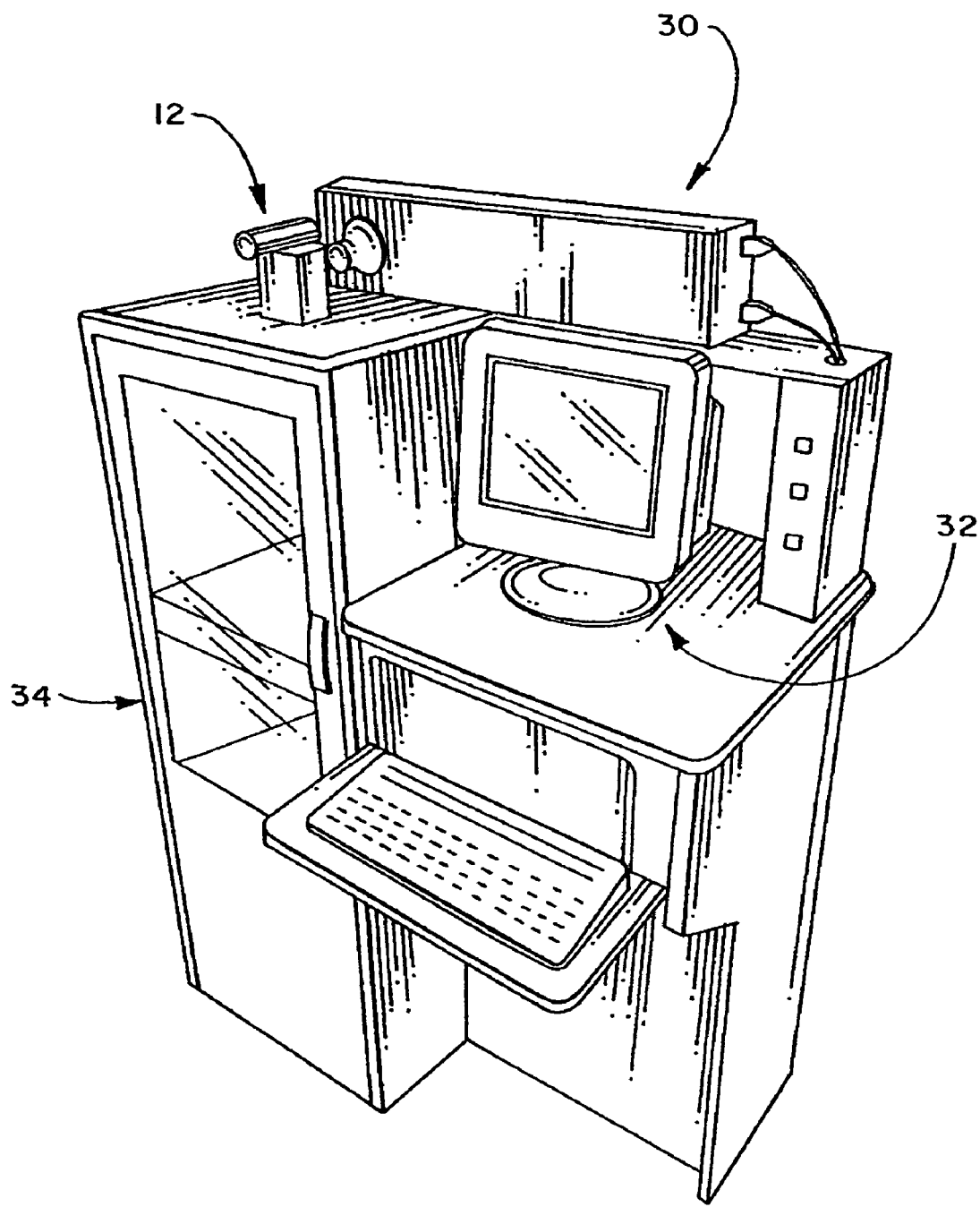
FIG. 2 is an illustration of a prior art SL machine which may serve as a preferred working environment of a multi-material SL machine of the present invention.

FIG. 2 depicts a preferred working environment of a multi-material SL machine 30 of the present invention. A computer 32 preferably controls the multi-material SL machine 30. A UV laser beam 12 apparatus preferably solidifies each slice of the model, thus the SL machine 30 builds a subject part 26 layer by layer in a UV shielded SL cabinet or enclosure 34. Moreover, the SL machine 30 is capable of fabricating layers within layers, thus facilitating more complex and intricate subject parts 26. The preferred working environment may be customized to suit a user's specifications. For example, the working environment may be fitted with one or more SL cabinets 34 to accommodate certain building requirements. The multi-material SL machine 30 of the present invention allows for a multitude of working environment configurations for added user and design flexibility.

Figure 3A:
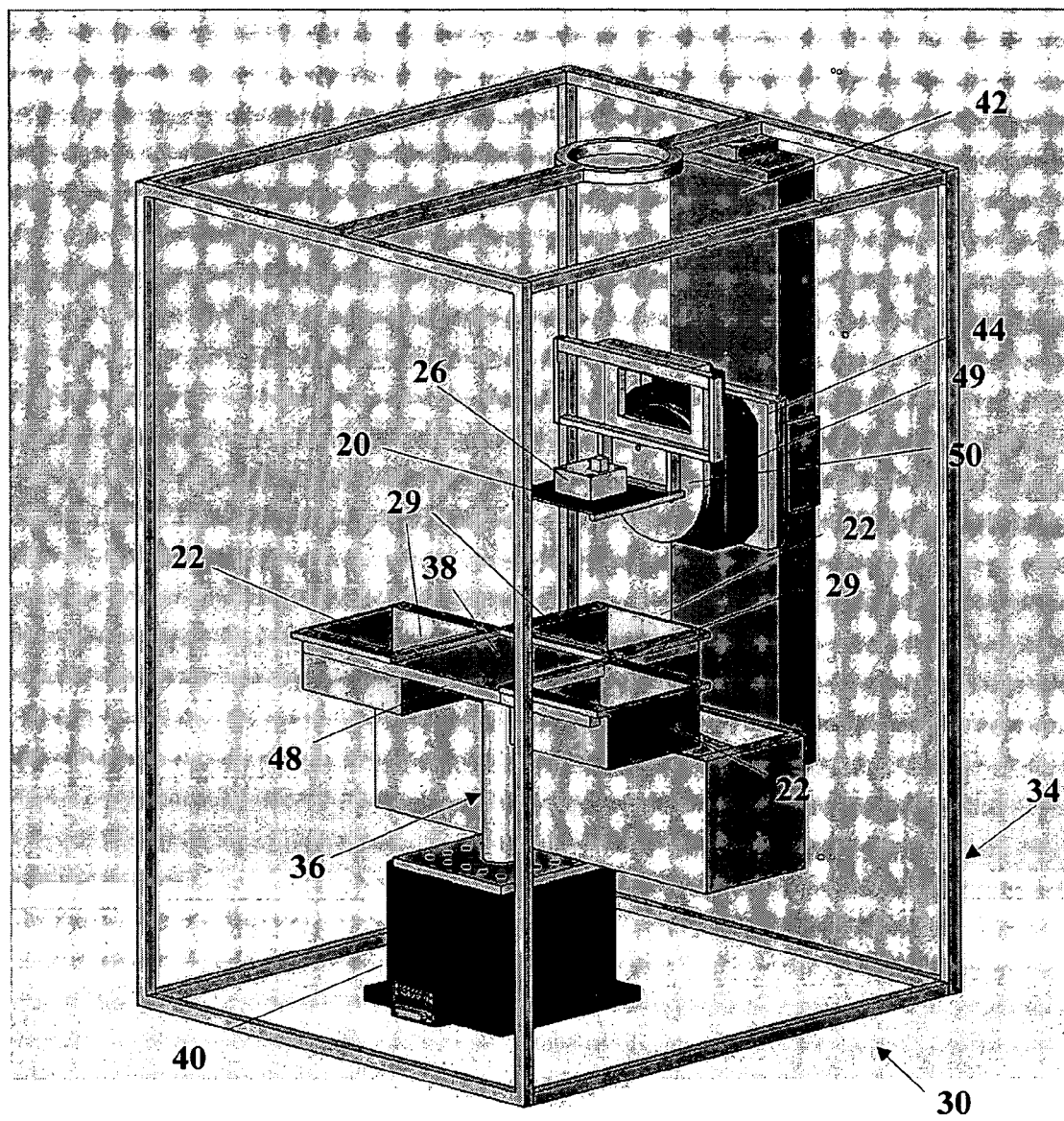
FIG. 3A is a perspective view of a preferred UV shielded cabinet, a preferred rotatable vat apparatus and optional platform rotation mechanism of an SL machine of the present invention.

A perspective view of a UV shielded SL cabinet 34 of a preferred embodiment of the multi-material SL machine 30 of the present invention is depicted in FIG. 3A. The UV shielded SL cabinet 34 features a movable vat apparatus 36 that may be rotated about a vat apparatus axis 38, as shown, or movable along a horizontal or transverse axis. It should be understood that the vat apparatus 36 may be configured in one of several alternative configurations to achieve the same functionality. (See, for example, FIG. 4). Alternative embodiments for the multi-material SL machine 30 of the present invention may include, for example, a single vat system, a stacked vat system or a fixed vat system each capable of accommodating intermediate washing and/or curing/drying of the subject part 26, while maintaining a sterile environment. For example, when building multi-material parts and/or devices, the SL machine 30 of the present invention should eliminate contamination between materials and/or resins. In the case of biomedical implants, the present invention further facilitates a biocompatible environment. It should be understood that intermediate washing, in most applications, is essential to eliminating contamination and maintaining a sterile building environment, while intermediate curing/drying may be an optional requirement to achieve the same.

Figure 5:
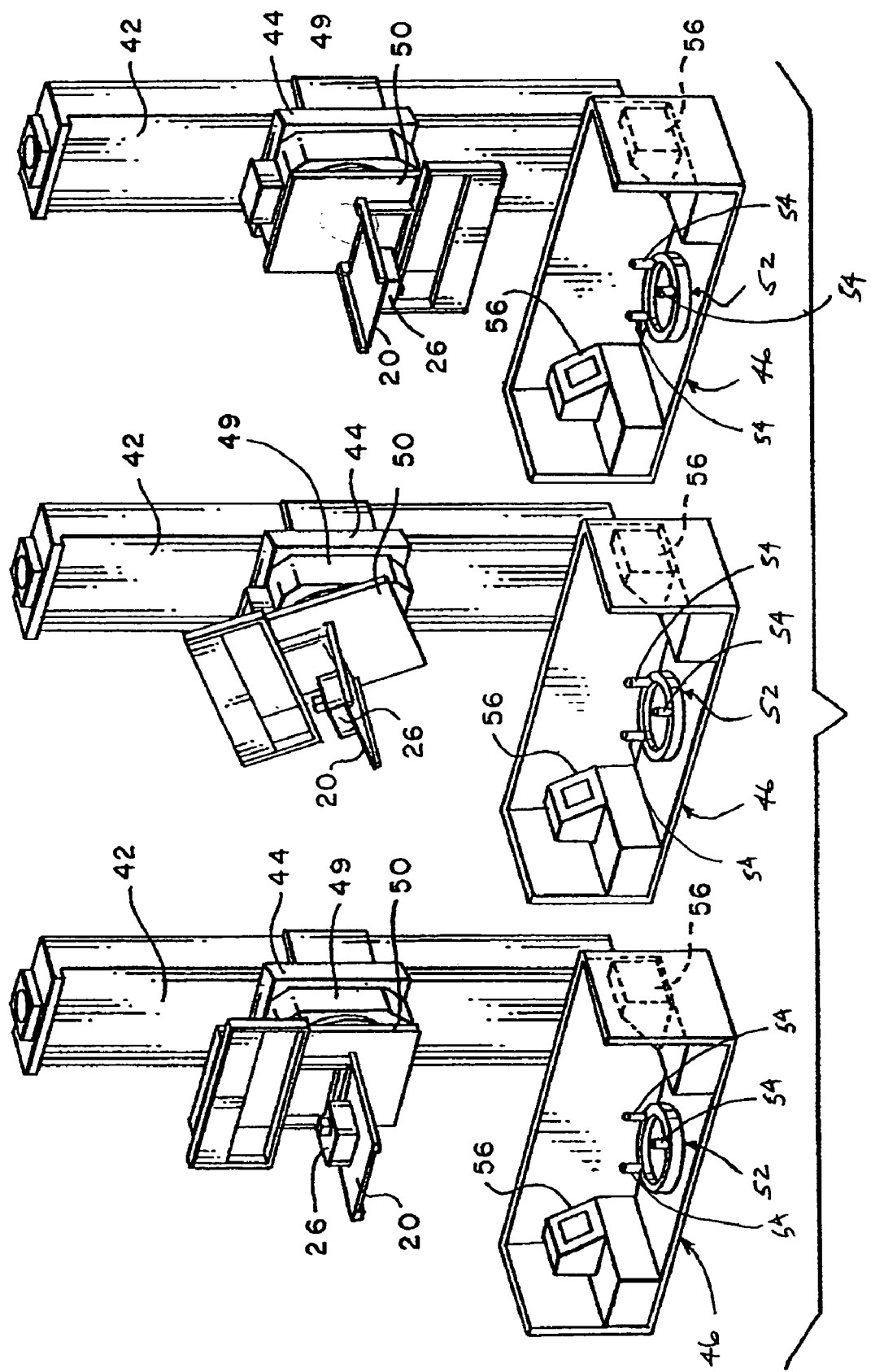
FIG. 5 is an illustration of the rotational capabilities of a preferred movable platform and optional platform rotation mechanism of the present invention.

Still referring to FIG. 3A, the preferred movable vat apparatus 36 may rest on a moveable vat apparatus rotation mechanism 40 affixed to the UV shielded (or otherwise shielded) SL cabinet 34, as shown, or similarly anchored to the cabinet 34. The preferred movable vat apparatus 36 contains three vats 22, as shown, or may comprise any number of vats 22, depending on the user's application or design criteria. The preferred vat 22, or resin retaining receptacle, of the present invention is designed to be of a dimension suitable to accommodate the movable platform 20. The movable platform 20, with the aid of one or more elevator mechanisms 42, raises, lowers and/or vertically traverses the subject part 26 into, for example, a vat 22 or a washing and curing/drying area 46 (as also shown in FIG. 5). Thus, as the movable platform 20 positions the subject part 26 to the desired position about or in a given vat 22, the multi-material SL machine 30 builds the subject part layer by layer or positions the part to build a layer within a layer. In addition, sweeping or recoating technologies known in the art and described earlier herein, as well as other alternative sweeping technologies and/or strategies, may be employed in accordance with the present invention. For example, in this particular embodiment, a recoating device 29 is employed to facilitate uniform liquid layers on the surface and eliminate trapped gases or bubbles and/or trapped volumes left on or underneath the platform 20 and/or the subject part 26 both before and during the building process. Thus, the multi-material SL machine 30 of the present invention provides a system for sweeping between layers of multi-material 3D models.

Figure 3B:
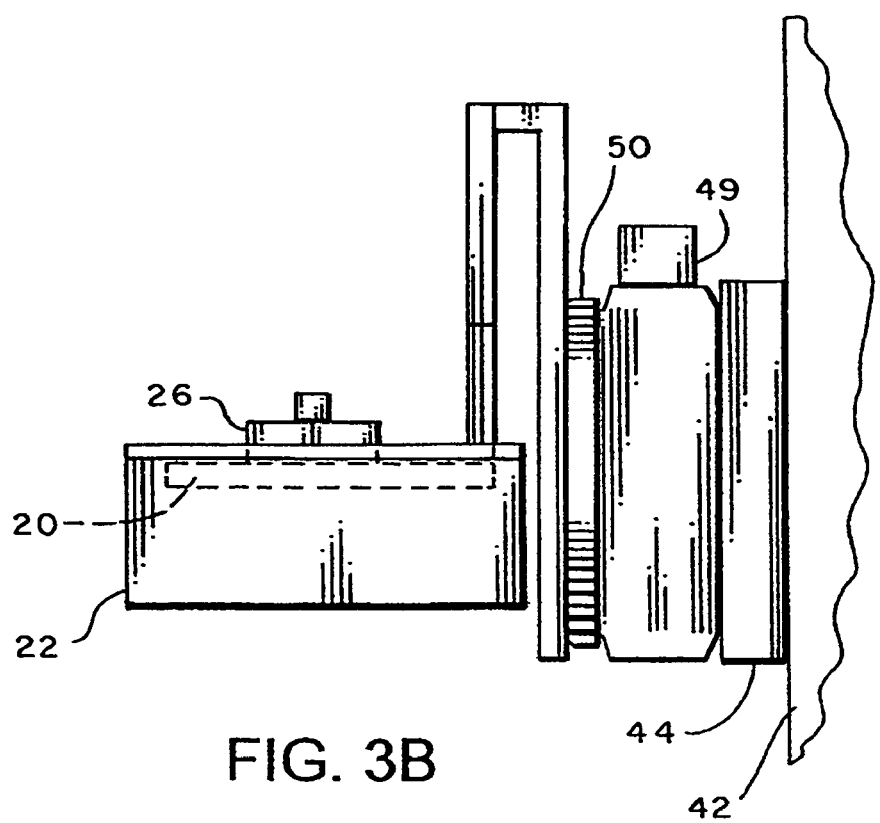
FIG. 3B is a perspective side view of a preferred movable platform and optional platform rotation mechanism of the present invention.
Figure 3C:
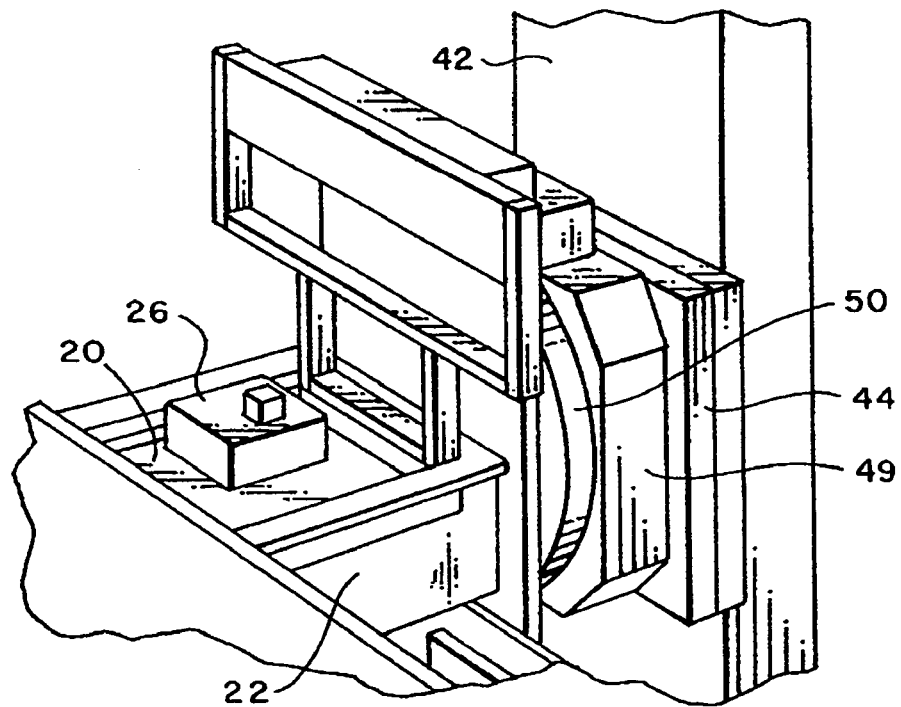
FIG. 3C is another perspective view of a preferred movable platform and optional platform rotation mechanism of the present invention shown when the movable platform is located in the material vat.
Figure 3D:
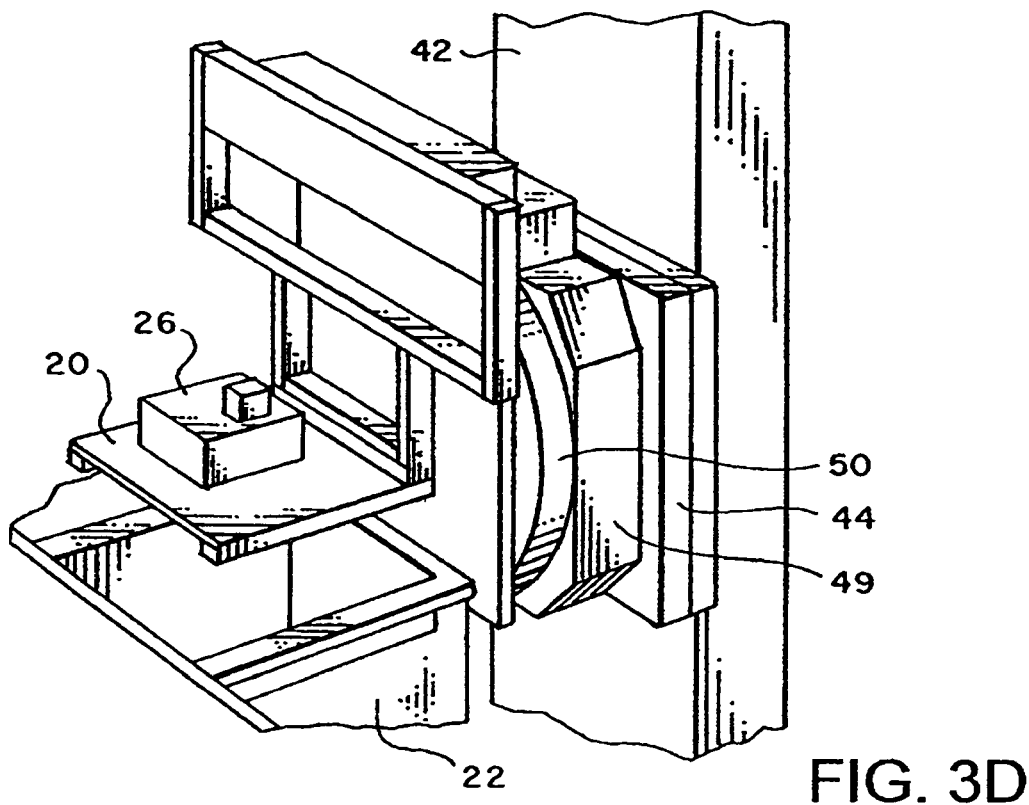
FIG. 3D is another perspective view of FIG. 3C shown when a preferred movable platform is located outside the material vat.

The preferred movable platform 20 is generally affixed to the elevator mechanism 42 by way of a mounting plate 44, a motorized rotation unit 49 and a platform rotation mechanism 50 as seen in the side perspective view of FIG. 3B and the angled perspective views of FIGS. 3C and 3D. The mounting plate 44 is affixed to the elevator mechanism 42 in such a manner allowing movement in a vertical manner along the length of the elevator mechanism. Thus, the movable platform 20 may be manipulated vertically as needed to customize building the subject part 26. The mounting plate 44 is also affixed to the rotation unit 49. The rotation unit 49 allows for controlled rotation of the movable platform 20 at any angle. The platform rotation mechanism 50, in turn, controls the movable platform 20 and aids in moving the platform as dictated by the rotation unit 49. Thus, the movable platform 20 may also be manipulated at any given angle to customize building the subject part 26 and/or clean, dry and/or post-cure the subject part 26 and platform 20 in the washing and curing/drying area 46. Accordingly, the multi-material SL machine 30 of the present invention provides a movable platform 20 configured to allow for controlled positioning about or in a given vat 22. For example, FIG. 3C illustrates the subject part 26 positioned inside the vat 22, while FIG. 3D illustrates the subject part positioned outside of the vat. The movable platform 20 may also be positioned to access any other desired area of the multi-material SL machine 30 or of other SL machines or cabinets 34 (shown in FIGS. 6A, 7A, 8A and 9A, as alternative examples).

Figure 4:
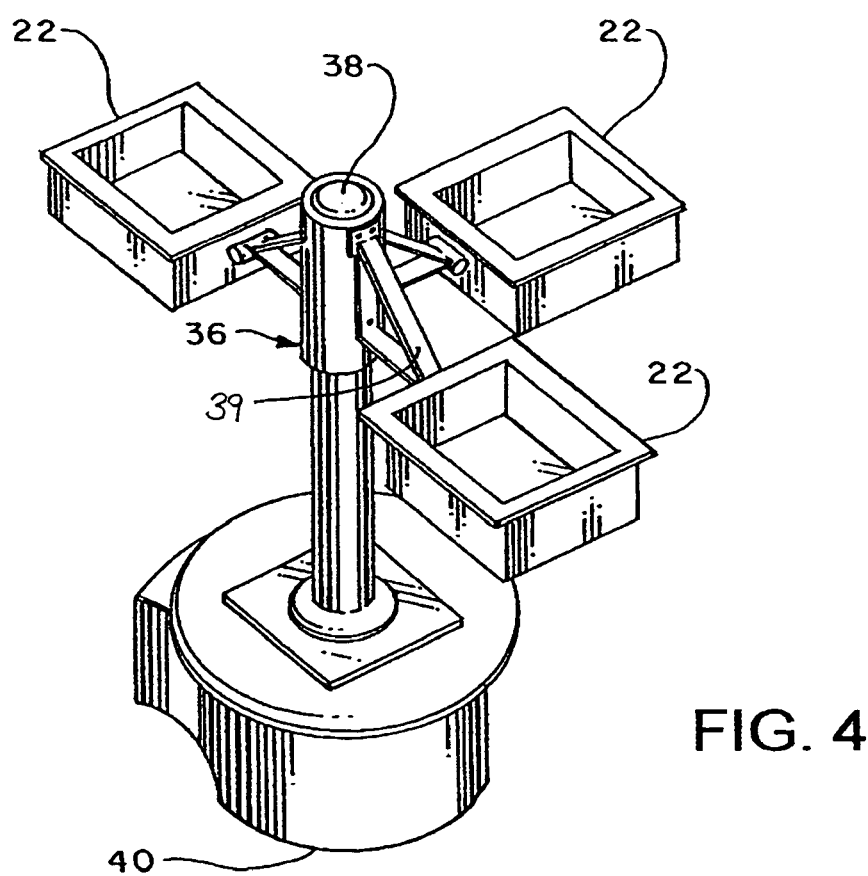
FIG. 4 is a perspective view of an alternative embodiment of a rotatable vat apparatus of the present invention.

As mentioned before, it should be understood that the movable vat apparatus 36 may be configured in one of several different embodiments. For example, FIG. 4 depicts an alternative embodiment of a movable vat apparatus 36. The movable vat apparatus 36 rests on a movable vat apparatus rotation mechanism 40 and is shown with three vats 22. The number and design of each vat 22 is customizable according to a specific application. For example, the vats 22 may be interchangeable and/or altered in shape or size. Although there may be several other embodiments, each vat 22, for example, may have a cross-sectional area of approximately 5 inches by 5 inches and a depth of approximately 3 inches and is located approximately 6 inches from the top of the movable vat apparatus rotation mechanism 40. It should be understood, however, that vats 22 may be configured in size and shape to suit particular applications and design criteria.

The preferred movable vat apparatus 36, as shown in FIG. 4, is capable of rotating about a vat apparatus axis 38. The movable vat apparatus rotation mechanism 40 may be attached to an axis 38 that provides rotational movement about an axis or an axis like structure. Although, the axis support members 48, as shown, connect each individual vat 22 to the vat apparatus axis 38, it should be understood that the design of the axis support member 48 may be altered without affecting functionality. In this particular embodiment, the vats 22 are preferably located 90 degrees from one another circumferentially (or spaced adequately apart if situated on a linearly movable structure). Again, alternative embodiments for the multi-material SL machine 30 of the present invention may include designs exhibiting a single vat system, a stacked vat system or a fixed vat system in lieu of the movable vat apparatus 36 and other design enhancements, as described later, for example, in conjunction with the description accompanying FIGS. 6A-9D.

In accordance with the present invention, multi-material manufacturing, or using more than one curable fluid medium 24 to build both across and in-between layers, is accomplished by incorporating intermediate wash, cure and dry cycles that maintain a sterile environment whereby different media do not contaminate one another. FIG. 5 provides a simplified depiction of the preferred embodiment of the movable platform 20, elevator mechanism 42, optional platform rotation mechanism 50, curing/drying units 56 and washing unit 52 of the present invention.

To change materials after building with a separate material, the vats 22 are rotated out of the way so that the elevator mechanism 42 can be traversed into the washing and curing/drying area 46. Once in the washing and curing/drying area 46, the movable platform 22 and the subject part 26, are washed using an appropriate solvent, usually depending on the application. For example, most preferred applications require an alcohol rinse. A solvent rinse jet or set of jets 54 deliver the desired solvent to the subject part 26. Any waste from the washing unit 52 remains contained within the washing and curing/drying area 46 for proper disposal.

Optionally, once the subject part 26 is cleaned, UV lamps or other curing and/or drying devices 56 are used to cure and/or dry any residue on the subject part. In accordance with the present invention, the curing/drying device 56 may be selected from one or more of the following: an ultraviolet light source, a particle bombarder, a chemical sprayer, a radiation impinger, an ink jet, an oven, a fan, a pump or any curing/drying device that incorporates convection, conduction and/or radiation heat transfer and any combinations thereof. In addition, curing may alternatively be accomplished through other wavelengths of excitation allowing proper curing as well as other forms of synergistic stimulation for a curable fluid medium, such as particle bombardment (electron beams and the like), chemical reactions by spraying materials through a mask or by ink jets or impinging radiation other than UV light.

The washing and/or curing/drying cycles may be repeated as required by the desired design criteria. After the desired washing and/or curing/drying procedures are complete, the moveable platform 20 is returned to its initial position or the top of a defined build envelope (a predetermined physical region encompassing the build space) and is then ready for immersion in the next build material or curable fluid medium 24 and/or placed in a location for part embedding or interaction with an alternative additive and/or subtractive manufacturing technology. After each layer or fraction of a layer is built, the entire subject part 26 is washed and optionally post-cured/dried. The parameters for the amount of time required for post-curing/drying, if desired, depends on the material and is potentially specific to the application with cure/dry times varying from zero to finite amounts of time. Once the building process is complete, the operator may need to sand, file or perform some additional finishing process on the subject part 26 as well as apply a paint, coating or some other material to the subject part in order to provide a certain surface finish and surface appearance. The present invention thus provides an integrated system that accommodates intermediate multi-material SL manufacturing.

Now referring to FIG. 5, the optional platform rotation mechanism 50 facilitates angled functionality when necessary, such as angled building, washing and/or curing/drying. The depiction on the far left in FIG. 5 illustrates the movable platform 20 in an upright, straight position. The depiction in the middle illustrates the movable platform 20 in an angled position, while the depiction on the far right illustrates the movable platform in an inverted position. Thus, the optional platform rotation mechanism 50 of the present invention provides a movable platform 20 with a full range of angled functionality.

The SL machine 30 of the present invention may optionally incorporate alternative manufacturing apparatuses 62 (as illustrated, for example, in FIG. 6A) that further aid in the manufacturing of prototypes and/or functional models. These alternative manufacturing apparatuses 62 may include additive and subtractive manufacturing technologies known in the art as well as quality control and inspection technologies known in the art including, for example, Computer Numerical Control (CNC) milling apparatuses and tool carousels, Coordinate Measuring Machine (CMM) probes and other vision measurement systems known in the art, Fused Deposition Modeling (FDM), Selective Laser Sintering (SLS), Layered Object Manufacturing (LOM) and other RP technologies known in the art, micro-machining systems, micro-jet and other cutting systems such as water jet, laser and plasma cutting systems known in the art, painting apparatuses, ink jets and other fluid and particle dispensing mechanisms and/or other pick and place technologies including robotic materials placement technologies. Thus, SL machines 30 in accordance with the present invention are versatile, multifunctional apparatuses that accommodate complex, multi-material manufacturing.

As mentioned earlier, alternative embodiments for the multi-material SL machine 30 of the present invention may include designs exhibiting a single vat system, a stacked vat system or a fixed vat system in lieu of the movable vat apparatus 36. An SL machine 30 in accordance with the present invention may also include designs that incorporate a horizontal traversing unit 58, as depicted for example in FIG. 6A. The horizontal traversing unit 58 transports the subject part 26 from one area of the SL machine 30 to another or between different SL cabinets 34. In order to further maintain the integrity of each area, the SL machine 30 may optionally include, for example, shielded chamber walls 60 (identified but not completely shown) between each area.

Figure 6A:
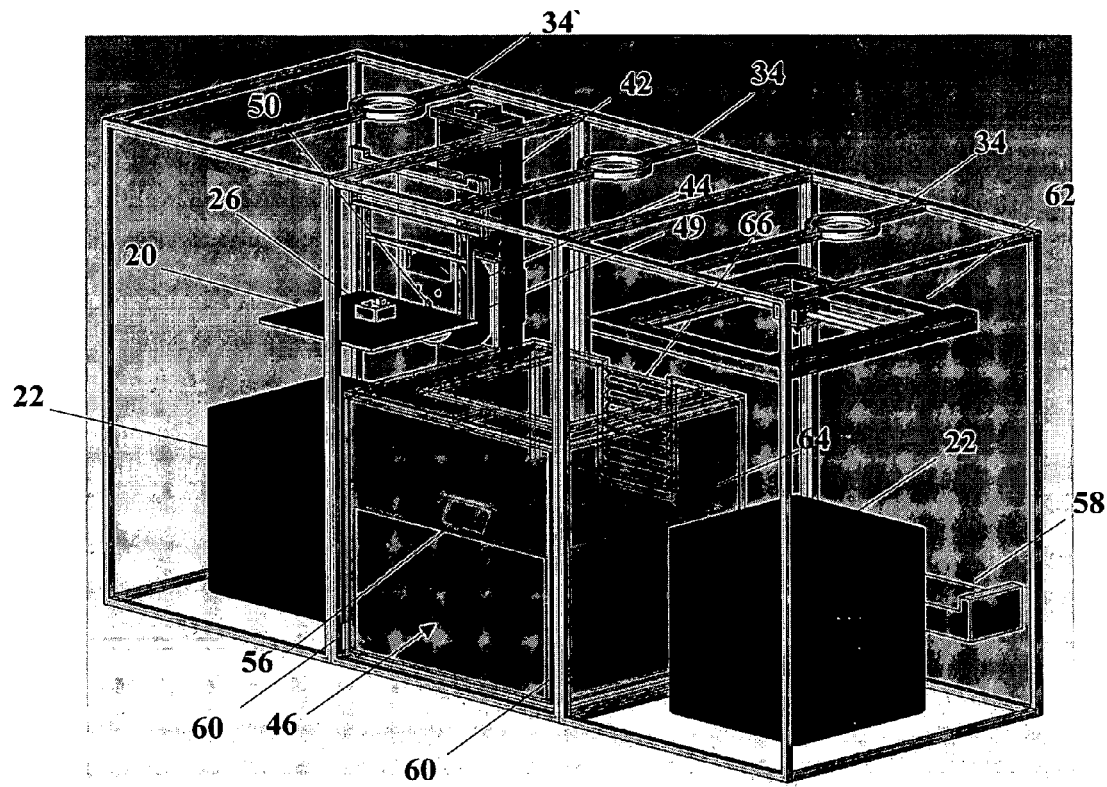
FIG. 6A is a perspective view of an alternative embodiment of an SL machine in accordance with the present invention shown with two single vats, an enclosed stationary washing area with a curing/drying unit, a movable platform, an elevator mechanism with an optional platform rotation mechanism, an optional alternative manufacturing apparatus and a horizontal traversing unit configured to access each of the above-listed components of the SL machine.

As an example, FIG. 6A depicts an alternative embodiment of an SL machine 30 in accordance with the present invention that may incorporate, inter alia, two single vats 22, an enclosed stationary washing and curing/drying area 46 (with various optional curing/drying units 56), a movable platform 20, an elevator mechanism 42 with optional rotation mechanism 50, an optional alternative manufacturing apparatus 62 and a horizontal traversing unit 58 configured to access each of the above-listed components of the multi-material SL machine 30. In this embodiment, the SL machine 30 has the ability to horizontally traverse the elevator mechanism 42 (and thus the platform 20) to different SL cabinets 34 by using the horizontal translation mechanism 58. The SL machine 30 therefore is capable of transporting the platform 20 between the different vats 22, while maintaining the ability to accomplish intermediate washing and/or curing/drying, as also depicted in another perspective view in FIG. 6B. In addition, as described earlier, the SL machine 30 of the present invention may incorporate an optional platform rotation mechanism 50 to facilitate angled part building, washing, curing and drying.

Figure 6B:
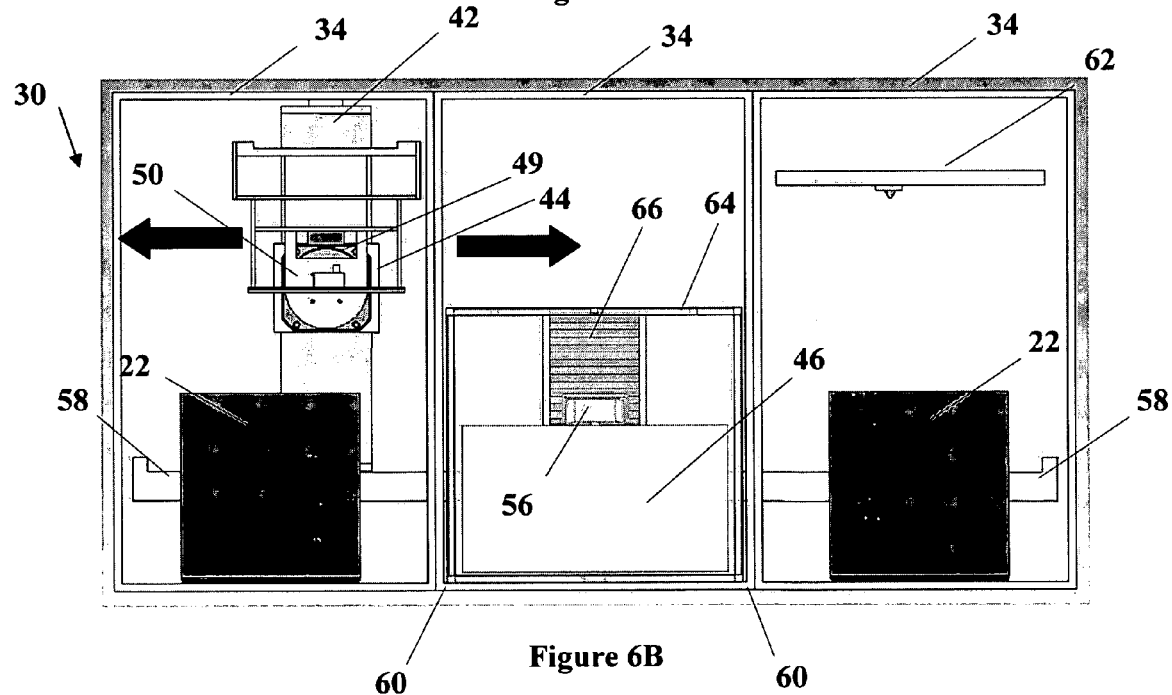
FIG. 6B is another perspective view of the alternative embodiment of FIG. 6A.

Still referring to FIGS. 6A and 6B, the washing and curing/drying area 46 may optionally be contained with enclosure 64. A retractable entrance 66 allows the elevator mechanism 42 and hence the platform 20 to be fully enclosed within an enclosure 64, when desired. In order to further maintain the integrity of each area, the multi-material SL machine 30 may optionally include shielded chamber walls 60 between each area (identified but not completely shown). It should be understood that the number and types of vats 22, washing and curing/drying area 46, horizontal translation mechanisms 58, alternative manufacturing apparatuses 62 and other multi-material SL machine 30 elements may be customized to suit any application and/or design criteria. Thus, the SL machine 30 in this example maintains a sterile, non-contaminating building environment, while facilitating an increased number of building materials. Accordingly, the SL machine 30 depicted in FIGS. 6A and 6B facilitates the manufacture of complex, multi-material prototypes and functional models.

Figure 7A:
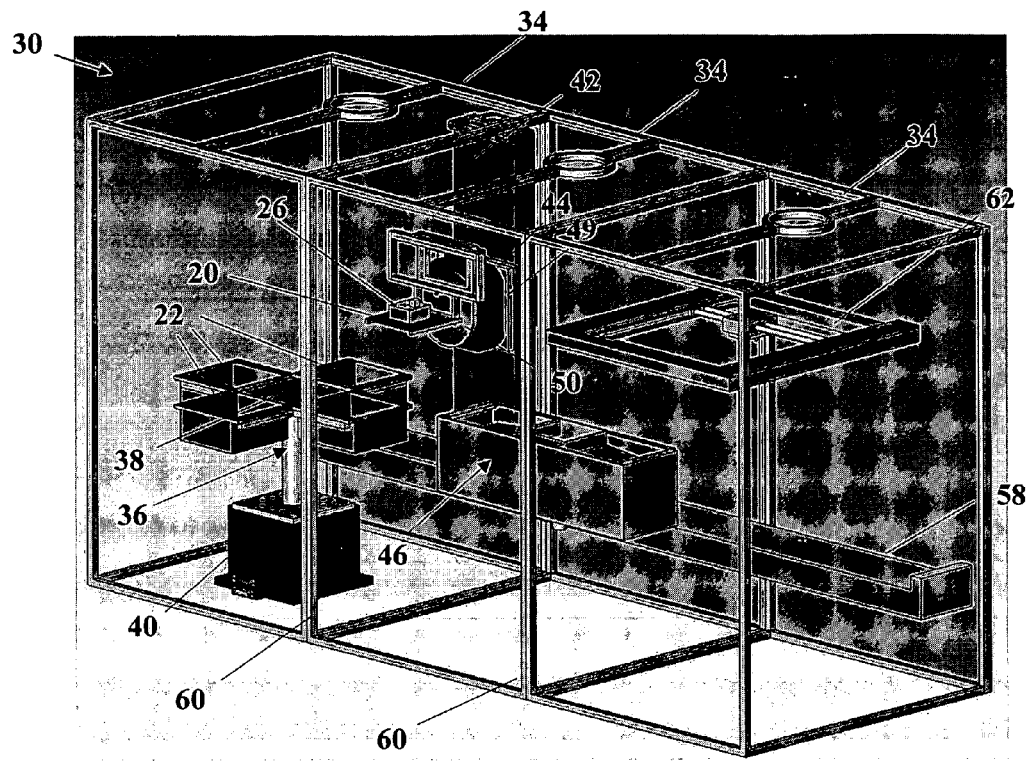
FIG. 7A is a perspective view of an alternative embodiment of an SL machine in accordance with the present invention shown with a single rotatable vat apparatus, a stationary washing area with a curing/drying unit, a movable platform, an elevator mechanism with an optional platform rotation mechanism, an optional alternative manufacturing apparatus and a horizontal traversing unit configured to access each of the above-listed components of the SL machine.
Figure 7B:
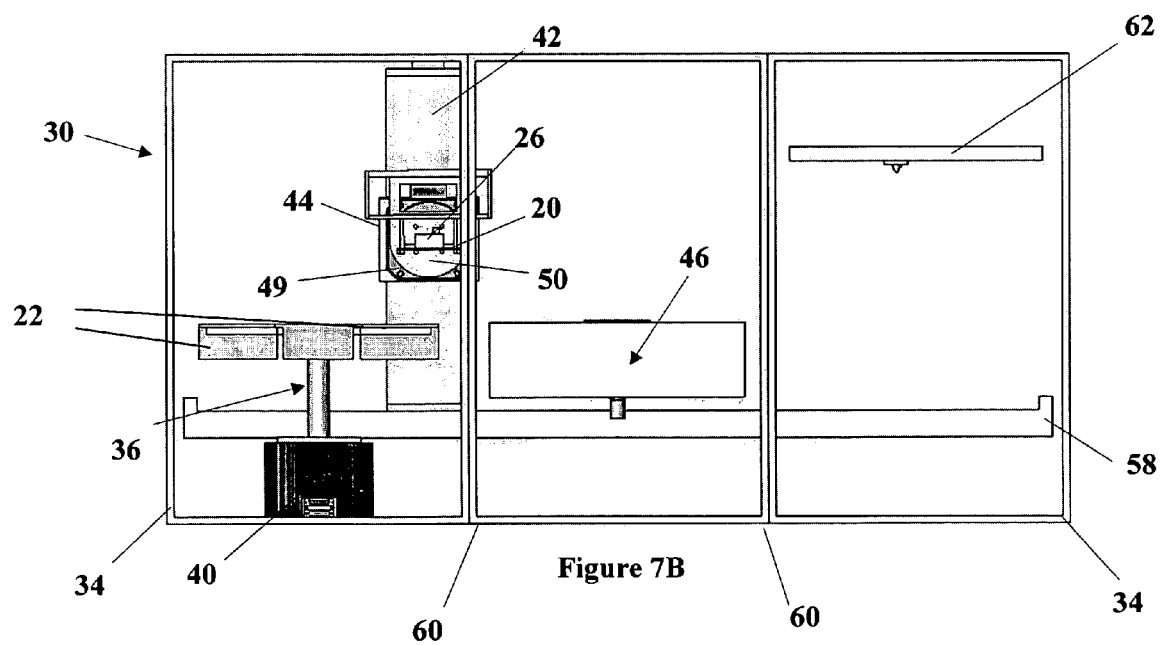
FIG. 7B is another perspective view of the alternative embodiment shown in FIG. 7A.

Referring now to FIGS. 7A and 7B, another embodiment of a multi-material SL machine 30 in accordance with the present invention may include, inter alia, with a single rotatable vat apparatus 36, a stationary washing and curing/drying area 46 (with an optional curing/drying unit—not shown), a movable platform 20, an elevator mechanism 42 with an optional platform rotation mechanism 50, an optional alternative manufacturing apparatus 62 and a horizontal traversing unit 58 configured to access each of the above-listed components of the SL machine 30. In this embodiment, the multi-material SL machine 30 has the ability to horizontally traverse the elevator mechanism 42 (and thus the platform 20) between the different SL cabinets 34, by using the horizontal translation mechanism 58. Thus, the SL machine 30 maintains the ability to accomplish intermediate washing and curing/drying, if desired. In addition, as described earlier, the SL machine 30 depicted in FIGS. 7A and 7B, incorporates an optional platform rotation mechanism 50 to facilitate angled part building, washing, curing and drying.

As described earlier in the previous example, an alternative embodiment of the multi-material SL machine 30 depicted in FIGS. 7A and 7B, may also optionally include shielded chamber walls 60 (identified but not completely shown) between each area in order to further maintain the integrity of each area. Alternatively, although not depicted in FIG. 7A or 7B, the washing and curing/drying area 46 may be contained within an enclosure (not shown) with a retractable entrance (not shown) allowing the elevator mechanism 42 and hence the platform 20 to be fully contained within enclosure, when desired. It should be understood that the number and types of vat apparatuses 36, washing and curing/drying area 46, horizontal translation mechanisms 58, alternative manufacturing apparatuses 62 and other multi-material SL machine 30 elements may be customized to suit any application and/or design criteria. Thus, the SL machine 30 in this embodiment also maintains a sterile, non-contaminating building environment, while facilitating an increased number of building materials. Accordingly, the SL machine 30 depicted in FIGS. 7A and 7B also facilitates the manufacture of complex, multi-material prototypes and functional models and further incorporates SL systems known in the art to accomplish multi-material stereolithography by separating the machines with an intermediate wash, cure and dry chamber.

Now referring to FIGS. 8A and 8B, still another embodiment of a multi-material SL machine 30 in accordance with the present invention, may include, inter alia, two rotatable vat apparatuses 36 separated by an enclosed stationary washing and curing/drying area 46, a movable platform 20, an elevator mechanism 42 with an optional platform rotation mechanism 50, an optional alternative manufacturing apparatus 62 and a horizontal traversing unit 58 configured to access each of the above-listed components of the SL machine. In this embodiment, the SL machine 30 has the ability to horizontally traverse the elevator mechanism 42 (and thus the platform 20) between vat apparatuses 36 and other processing areas that are housed in different cabinets 34, by using the horizontal translation mechanism 58. Thus, the multi-material SL machine 30 maintains the ability to accomplish intermediate washing and curing/drying. In addition, as described earlier, the SL machine 30 of the present invention may incorporate an optional platform rotation mechanism 50 to facilitate angled part building, washing, curing and drying.

Just as in the other embodiments, the multi-material SL machine 30 depicted in FIGS. 8A and 8B, may also optionally include shielded chamber walls 60 (identified but not completely shown) between each area in order to further maintain the integrity of each area. The washing and curing/drying area 46 may be contained within an enclosure 64 equipped with a retractable entrance 66 which allows the elevator mechanism 42 and hence the platform 20 to be fully contained within the enclosure, when desired. It should be understood that the number and types of vat apparatuses 36, washing and curing/drying area 46, horizontal translation mechanisms 58, alternative manufacturing apparatuses 62 and other multi-material SL machine 30 elements may be customized to suit any application and/or design criteria. Thus, the multi-material SL machine 30 in this embodiment also maintains a sterile, non-contaminating building environment, while facilitating an increased number of building materials. Accordingly, the SL machine 30 depicted in FIGS. 8A and 8B also facilitates the manufacture of complex, multi-material prototypes and functional models and accomplishes multi-material stereolithography by separating the machines with an intermediate washing and curing/drying area 46.

The multi-material SL machine 30 of the present invention may also incorporate other traversing mechanisms that transport the platform 20 and subsequently the subject part 26 to different areas of the SL machine. For example, the multi-material SL machine 30 may incorporate a dual-sided elevator mechanism 64, as depicted, in FIGS. 9A, 9B and 9C attached to an elevator mechanism rotation mechanism 66 thus transporting platforms 20 to different areas of the SL machine 30. Thus, the multi-material SL machine 30 has the ability to transport a subject part 26 from one area to another in a space saving and time efficient manner. In this particular embodiment, two platforms 20 are utilized to increase build efficiencies and reduce overall build times. It should be understood, however, that the SL machine 30 may be designed with any number of platforms 20.

Figure 9A:
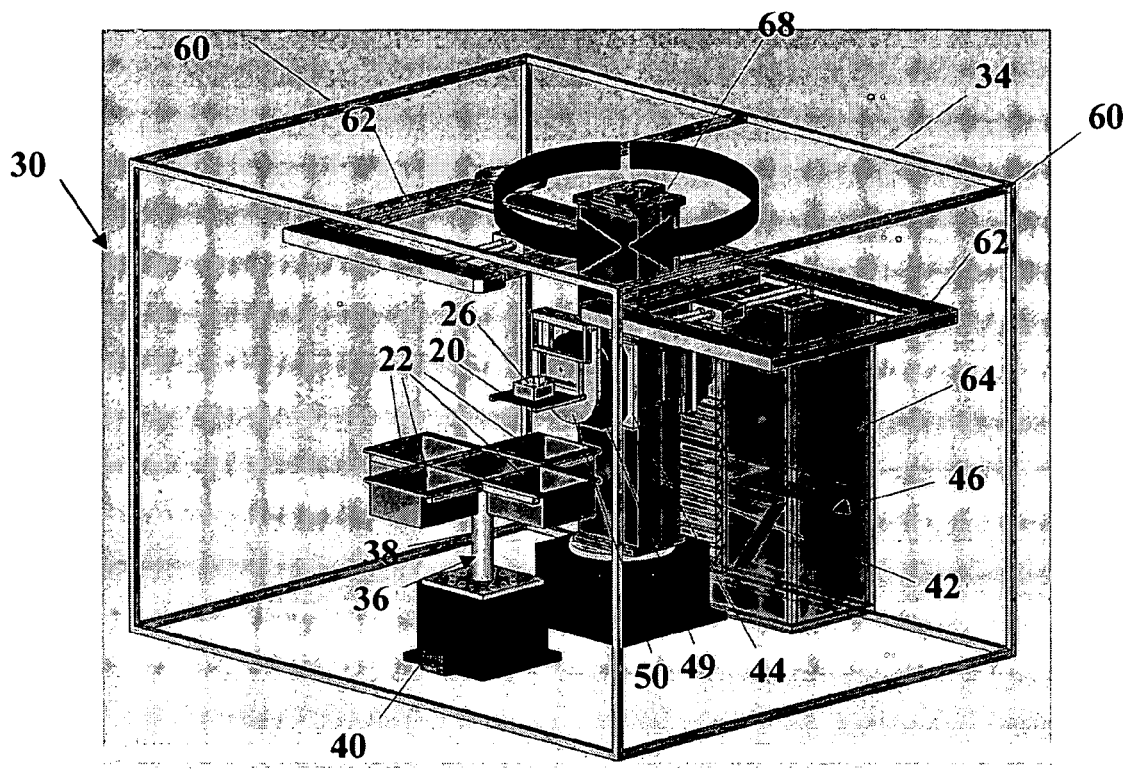
FIG. 9A is a perspective view of still another alternative embodiment of an SL machine in accordance with the present invention shown with a rotatable vat apparatus, an enclosed stationary washing area with curing/drying unit, two optional alternative manufacturing apparatuses and a dual-sided, rotatable elevator mechanism with two movable platforms, shown with optional platform rotation mechanisms configured to access each of the above-listed components of the SL machine.
Figure 9B:
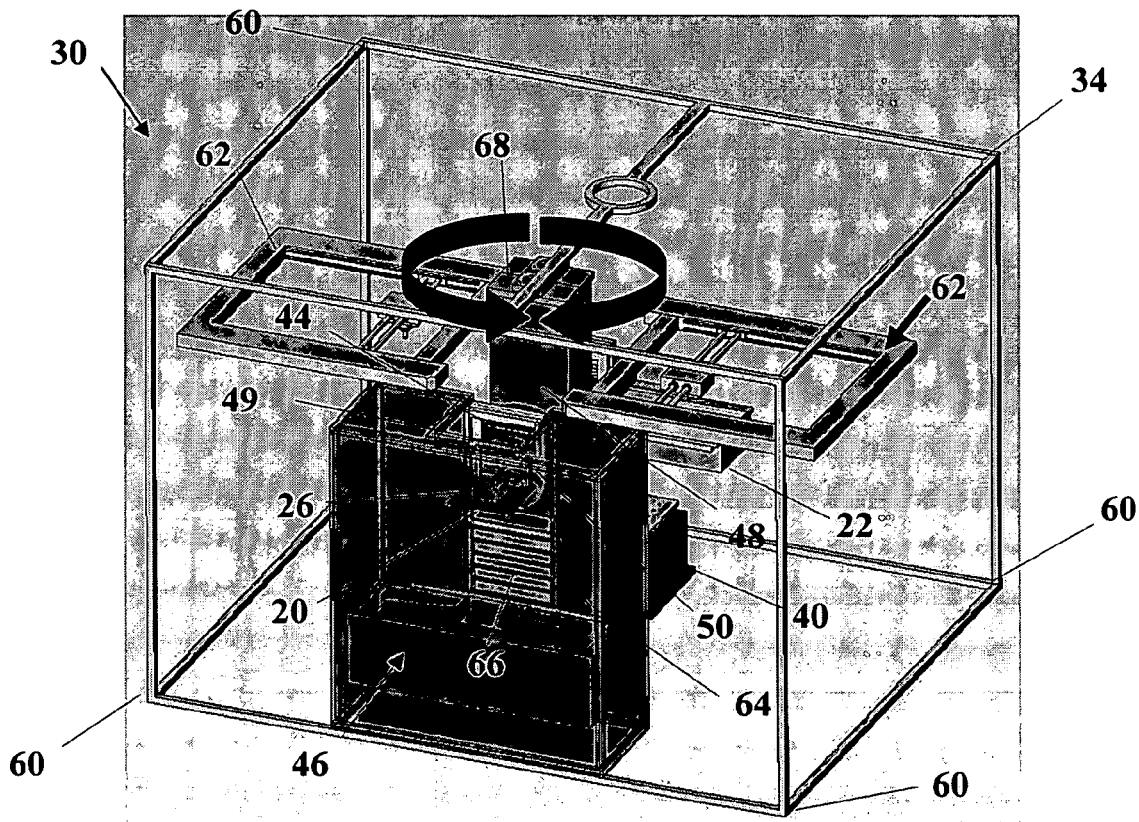
FIG. 9B is another perspective view of the alternative embodiment shown in FIG. 9A.
Figure 9C:
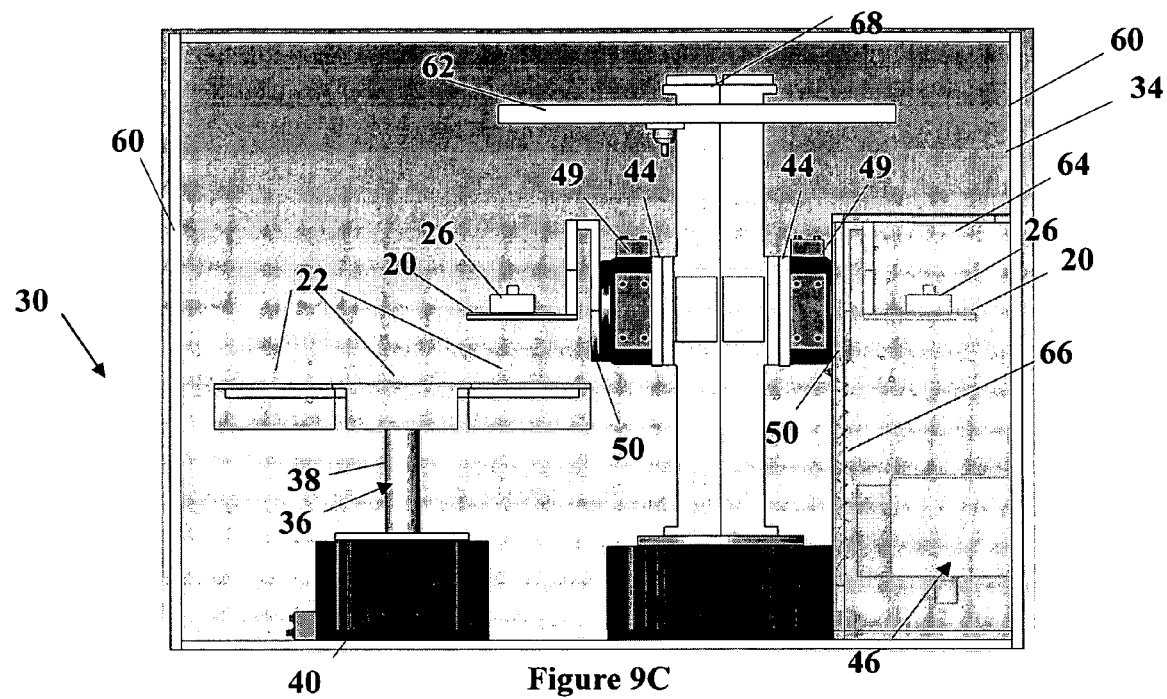
FIG. 9C is yet another perspective view of the alternative embodiment shown in FIG. 9A.
Figure 9D:
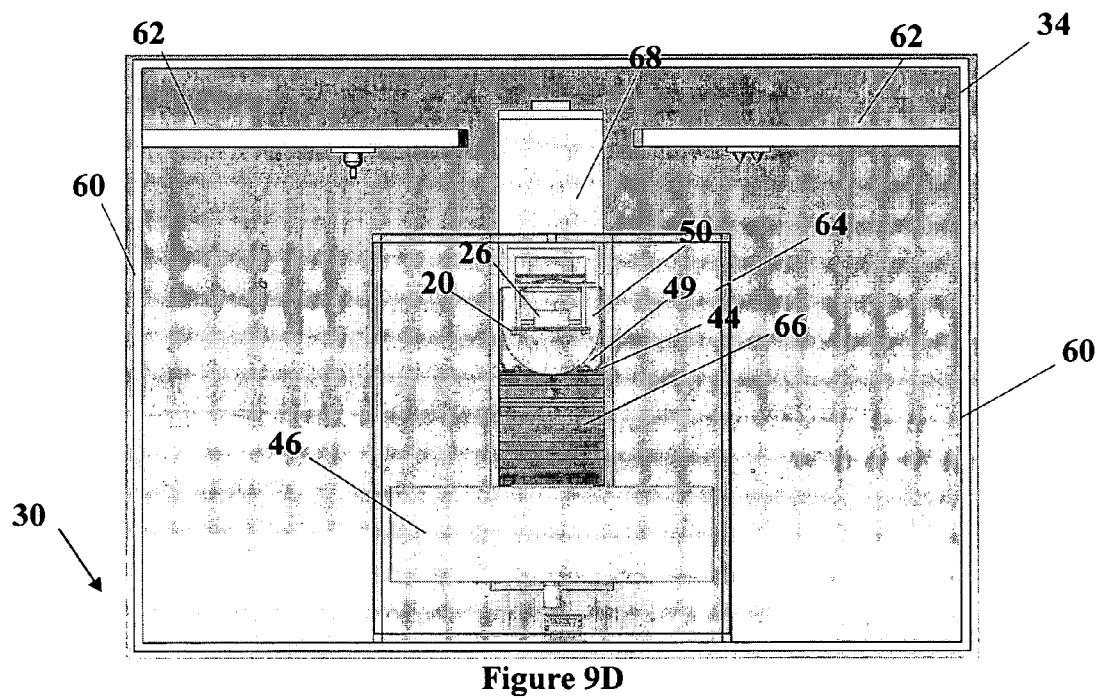
FIG. 9D is still another perspective view of the alternative embodiment shown in FIG. 9A.

For example, an SL machine 30 in accordance with the present invention may incorporate, inter alia, a vat apparatus 36, a stationary washing and curing/drying area 46 and a dual sided elevator mechanism 64 housed in a single SL cabinet 34, as depicted in FIG. 9A. In this embodiment, the SL machine 30 has the ability to rotatably traverse the elevator mechanism 42 (and thus platform 20) between vat apparatus 36 and the washing and curing/drying area 46, thus maintaining the ability to conduct intermediate washing and curing/drying, as also depicted in FIGS. 9B and 9C. Each platform 20 is optionally connected to an elevator mechanism 42 with optional platform rotation mechanisms 50. In addition, as described earlier, the SL machine 30 of the present invention may incorporate an optional platform rotation mechanism 50 to facilitate angled part building, washing, curing and drying. In order to further maintain the integrity of each area, the SL machine 30 may optionally include shielded chamber walls 60 (identified but not completely shown) between each area.

It should be understood that the number and types of vat apparatuses 36, washing and curing/drying area 46, dual sided elevator mechanisms 64, alternative manufacturing apparatuses 62 and other SL machine 30 elements may be customized to suit any application and/or design criteria, including building more complex apparatuses optionally configured with horizontally traversing mechanisms 58 (not shown). Thus, the multi-material SL machine 30 in this embodiment also maintains a sterile building environment, while facilitating an increased number of building materials and multiple methods of manufacturing. Accordingly, the multi-material SL machine 30 depicted in FIGS. 9A-9D facilitates the customizable manufacture of complex, multi-material prototypes and functional models.

Just as in other embodiments, the multi-material SL machine 30 depicted in FIGS. 9A-9D may also optionally include shielded chamber walls 60 (identified but not completely shown) between each area in order to further maintain the integrity of each area. The washing and curing/drying area 46 may be contained within an enclosure 64 equipped with a retractable entrance 66 which allows the dual sided elevator mechanism 68 and hence the platform 20 to be fully contained within the enclosure, when desired. The dual sided elevator mechanism 68 is adapted to rotate about a vertical axis, as illustrated, Thus, the dual sided elevator mechanism 68 allows, for example, a platform to be traversed from one side of the dual sided mechanism to the other side. It should be understood that the number and types of vat apparatuses 36, washing and curing/drying area 46, dual sided elevator mechanisms 68, alternative manufacturing apparatuses 62 and other multi-material SL machine 30 elements may be customized to suit any application and/or design criteria. Thus, the multi-material SL machine 30 in this embodiment also maintains a sterile, non-contaminating building environment, while facilitating an increased number of building materials. Accordingly, the multi-material SL machine 30 depicted in FIGS. 9A-9D also facilitates the manufacture of complex, multi-material prototypes and functional models and further incorporates SL systems known in the art to accomplish multi-material stereolithography by separating the machines with an intermediate washing and curing/drying area 46.

Figure 10:
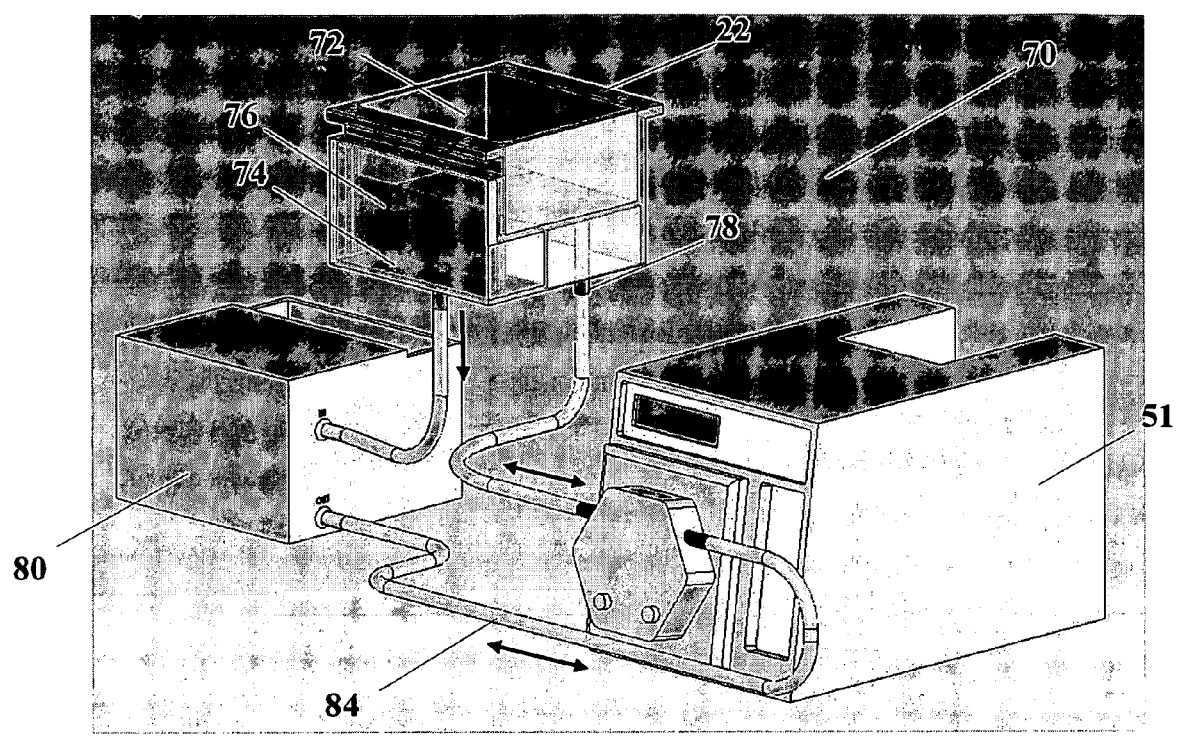
FIG. 10 is a perspective view of a preferred vat material fill/remove system of the present invention.

As described earlier, as each layer is built, the subject part 26 can be raised and/or lowered into a curable fluid medium 24 contained in the vat 22. It is not only important to control the height of the subject part 26, but also to control the level of curable fluid medium 24 in each vat 22. The present invention may utilize any one of a number of methods known in the art for vat fill and liquid level control in each vat 22. The preferred embodiment incorporates a vat material fill/remove system 70 (as depicted in FIG. 10) or other pumps or pump systems known in the art to fill and/or remove fluid media 24 from the vats 22. The pump 51 preferably allows isolation of the curable fluid medium 24 from the moving parts of the vat apparatus 36 and provides a means for mechanically adding and removing precise quantities of fluid from/to a vat 22.

For example, in a preferred embodiment depicted in FIG. 10, each vat 22 may incorporate a vat material fill/remove system 70. A preferred vat material fill/remove system 70 maintains a constant liquid level within an associated vat 22 by continuously pumping liquid into the vat through a pump 51. A vat material fill/remove system 70 utilizes, for example, a peristaltic pump 51 that isolates the fluid media 24 from mechanical pump parts. Using the preferred vat material fill/remove system 70, precise liquid levels can be controlled, without using the overfill drain vat chamber 74 (as described later herein), by filling and removing precise amounts of fluid media 24 by using only a pump known in the art. The preferred controlled delivery amount and preferred vat 22 cross-section described earlier herein may yield a minimum build layer thickness of, but not limited to, approximately 0.5 mil.

In accordance with the preferred embodiment of a vat material fill/remove system 70 depicted in FIG. 10, each vat 22 is configured to comprise at least two fluid media retaining chambers, the main vat chamber 72 and an overfill vat chamber 74. The main vat chamber 72 is configured such that a platform 20 (not shown in FIG. 10) of a given multi-material SL machine 30 fits within it. The volume of the main vat chamber 72 may be adjusted by repositioning a leveling gate 76. Preferably, the leveling gate 76 may be repositioned by traversing the leveling gate in a vertical manner. It should be understood, however, that the leveling gate 76 may be traversed in any direction such as to alter the volume of the main vat chamber 72 after repositioning.

A peristaltic pump (or any pump known in the art) 51 supplies and removes fluid media 24 (not shown) from the main vat chamber 72 in a controlled manner via a bidirectional main building area supply tube 78. Thus, the vat material fill/remove system 70 maintains constant levels of fluid media 24 within the main vat chamber 72. It should be understood, however, that the pump system 51 can also be utilized to precisely control the liquid level within the vat system by filling/removing precise amounts of fluid from the vat 22. Thus, optionally eliminating the need for the overfill drain chamber 74. It should also be further understood that liquid level sensing systems such as the laser level sensing system 14 currently employed in SL systems known in the art can also be employed here (as later described herein).

When employed, the optional overfill vat chamber 74 is adjacent to the main vat chamber 72 and collects fluid media 24 from the main vat chamber, when fluid media levels are in excess of the height of the leveling gate 76. As fluid media 24 collects in the overfill vat chamber 74, the fluid media is transported to the material reservoir 80 (via a unidirectional overfill tube 82) for recycling. The material reservoir 80, in turn, supplies the peristaltic pump 51 and vice versa, via a bidirectional reservoir tube 84. The vat material fill/remove system 70 in accordance with the multi-material SL machine 30 of the present invention, thus maintains, for example, a constant level of fluid media 24 in the main vat chamber 72, prevents fluid media 24 overflow from the main vat chamber and aids in conserving fluid media. The vat material fill/ remove system 70, thus, fosters a sterilized system and easily increases multi-material capability.

There are several alternative liquid level sensing systems that may be employed to sustain an appropriate liquid level in each vat 22. Laser level sensing systems 14 known in the art, for example, may be utilized for liquid level sensing. Alternatively, various other level sensing systems may be utilized for platform 20 level sensing. Various level sensing and/or contact or non-contact displacement measurement systems such as eddy current displacement systems, confocal chromatic displacement measurement systems, lineal variable displacement transducers, proximity switches and others known in the art could be employed individually or in combination to provide accurate displacement measurements of the liquid level and/or the platform 20. Such level sensing systems will help improve build tolerances. The pump or pump system 51 described earlier herein could be incorporated with the level sensing system to precisely control the liquid level (or the platform 20 level), as required. It can be appreciated that any or all of these alternative approaches may be combined for a particular application or for use in customized systems.

The present invention accordingly provides for SL processing to form multi-material parts. The materials may be rigid, semi-rigid, liquid (may be encapsulated liquid) or gas (trapped gases). There are numerous examples of curable fluid media 24 suitable for use with the present invention. Examples of curable fluid media 24 or materials that may be incorporated in curable fluid media 24 include SL resins known in the art, hydrogels, bioactive ingredients, cells, imbedded devices or materials, photopolymer resins and powdered materials. Some types of powdered materials may be converted from a fluid-like medium to a cohesive cross-section by processes, such as melting and solidification.

Hydrogels are examples of a curable fluid medium and may be, for example, a natural polymer, synthetic polymer or some combination thereof. Natural polymer hydrogels include polymers such as anionic polymers (for example, hyaluronic acid, alginic acid, pectin, carrageenan, chondroitin sulfate, dextran sulfate), cationic polymers (for example, chitosan and polylysine), amphipathic polymers (such as collagen, gelatin, carboxymethyl chitin and fibrin) and neutral polymers (for example, dextran, agarose and pullulan) and their derivatives.

Synthetic polymer hydrogels, on the other hand, include, for example, polymers such as polyesters: poly(ethylene glycol)-poly(lactic acid)-poly(ethylene glycol); poly(ethylene glycol)-poly(lactic-co-glycolic acid)-poly(ethylene glycol); poly(ethylene glycol)-polycaprolactone-poly(ethylene glycol); poly(lactic acid)-poly(ethylene glycol)-poly(lactic acid); poly(hydroxyl butyrate); poly(propylene fumerate-co-ethylene glycol)±acrylate end groups; and poly(poly(ethylene glycol)/poly(butylene oxide)terephthalate).

Synthetic polymer hydrogels may include, for example, other polymers such as: poly(ethylene glycol)-bis-(poly(lactic acid)-acrylate); poly(ethylene glycol)±cyclodextrins; poly(ethylene glycol)-g-poly(acrylamide-co-Vamine); polyacrylamide; poly(N-isopropyl acrylamide-co-acrylic acid); poly(N-isopropyl acrylamide-co-ethyl methacrylate); poly(vinyl acetate)/poly(vinyl alcohol); poly(N-vinyl pyrrolidone); poly(methyl methacrylate-co-hydroxyethyl methacrylate); poly(acrylonitrile-co-allyl sulfonate); poly(biscarboxy-phenoxy-phosphazene); and poly(glucosylethyl methacrylate-sulfate).

Combinations of natural and synthetic polymer hydrogels may include polymers such as poly(polyethylene glycol-co-peptides), alginate g-(polyethylene oxide-polypropylene oxide-polyethylene oxide), poly(polylactic-co-glycolic acid-co-serine), collagen-acrylate, alginate-acrylate, poly(hydroxyethly methacyrlate-g-peptide), poly(hydroxyethyl methacyrlate/Matrigel®) and hyraluronic acid-g-N-isopropyl acrylamide).

Yet other examples of curable fluid media 24 include, for example: (1) radically polymerizable organic compounds (such as urethane, (meth)acrylate, oligester (meth)acrylate, epoxy (meth)acrylate, thiol compound, ene compound and photosensitive polyimide); (2) cationically polymerizable organic compounds (such as an epoxy compound, cyclic ether compound, cyclic lactone compound, cyclic acetal compound, clycle thioesther compound, spiro orthoester compound and vinyl ether compound); (3) radically polymerizable organic compound and a catonically polymerizable organic compound; and (4) radically polymerizable organic compound (an ethylenically unsaturated monomer), a polyether, polyol compound and elastomer particles.

Moreover, also in accordance with the present invention, multi-colored manufacturing is accomplished by mixing pigments, paints, dyes and/or other color media into the curable fluid medium 24, thereby facilitating the manufacture of multi-colored prototypes and models. Similarly, other materials may, optionally, be mixed into the fluid medium 24 to alter the strength, thermal, mechanical, optical, electrical, functional and/or biofunctional properties thereby facilitating the manufacture of multi-functional, multi-material, multi-colored, multi-element and/or implantable prototypes, models and finished products. The present invention thus facilitates using SL technology to aid in manufacturing of parts in an endless number of materials and colors. The present invention also facilitates manipulating certain materials to exhibit altered properties at select locations during the building stage.

Although preferred embodiments of the present invention have been described in detail, it will be understood by those skilled in the art that various modifications can be made therein without departing from the spirit and scope of the invention as set forth in the appended claims.

What is claimed is:

1. A stereolithography apparatus comprising:
   one or more lasers adapted to perform stereolithography to fabricate a subject part;
   a plurality of polymer retaining receptacles adapted to retain polymers, the plurality of polymer retaining receptacles comprising:
      a first retaining receptacle that holds a first polymer; and
      a second retaining receptacle that holds a second polymer that is not the same as the first polymer; and
   a movable platform accessible to the plurality of polymer retaining receptacles, where:
      the movable platform is configured to support the subject part, be translated relative to the plurality of polymer retaining receptacles, and be positioned within each of the plurality of polymer retaining receptacles.

2. The stereolithography apparatus of claim 1, further comprising one or more washing areas accessible to the movable platform.

3. The stereolithography apparatus of claim 1, wherein the movable platform comprises an elevator mechanism adapted to traverse the movable platform along a vertical axis.

4. The stereolithography apparatus of claim 3, wherein the elevator mechanism further comprises a rotation mechanism adapted to rotate the movable platform about a horizontal axis.

5. The stereolithography apparatus of claim 3, wherein the elevator mechanism is further adapted to rotate about a vertical axis.

6. The stereolithography apparatus of claim 1, wherein the washing area comprises:
one or more rinse jets; and
one or more waste receptacles.

7. The stereolithography apparatus of claim 1, wherein the apparatus further comprises one or more shielded cabinets to house the washing unit.

8. The stereolithography apparatus of claim 1, wherein the laser is an ultraviolet laser.

9. The stereolithography apparatus of claim 1, wherein the receptacle further comprises one or more pumps connected to the polymer retaining receptacle.

10. The stereolithography apparatus of claim 9, wherein the pump is adapted to maintain the level of the polymer to fill or remove the polymer from the polymer retaining receptacle.

11. The stereolithography apparatus of claim 9, wherein the pump is adapted to isolate the polymer from the pump's parts.

12. The stereolithography apparatus of claim 1, wherein the polymer is a photocurable polymer.

13. The stereolithography apparatus of claim 1, wherein the polymer is a hydrogel selected from the group consisting of natural polymers, synthetic polymers and any combinations thereof.

14. The stereolithography apparatus of claim 1, wherein the polymer is a resin composition selected from the group consisting of: a radically polymerizable organic compound, a cationically polymerizable organic compound; a polyether, polyol compound, elastomer particle and any combination thereof.

15. The stereolithography apparatus of claim 1, wherein the polymer is selected from the group consisting of stereolithography resins, curable inks, photopolymer resins, photopolymer powdered materials and any combination thereof.

16. The stereolithography apparatus of claim 1, wherein the polymer further comprises one or more additives.

17. The stereolithography apparatus of claim 16, wherein the additive is selected from the group consisting of color altering, thermal property altering, electrical property altering, optical property altering, mechanical property altering, strength altering, function altering, biofunction altering additives and any combination thereof.

18. The stereolithography apparatus of claim 16, wherein the additive is selected from the group consisting of an imbedded device, an imbedded material, such as bioactive ingredients and cells, and any combination thereof.

19. The stereolithography apparatus of claim 1, wherein the apparatus further comprises one or more horizontal translation mechanisms adapted to access the polymer retaining receptacle and the washing unit.

20. The stereolithography apparatus of claim 1, wherein the apparatus further comprises one or more curing/drying units.

21. The stereolithography apparatus of claim 20, wherein the curing/drying unit is selected from the group consisting of an ultraviolet light source, a particle bombarder, a chemical sprayer, a radiation impinger, an ink jet, an oven, a fan, a pump, a curing device and a drying device that incorporates convection, conduction and/or radiation heat transfer and any combinations thereof.

22. The stereolithography apparatus of claim 20, wherein the apparatus further comprises one or more horizontal translation mechanisms adapted to access the polymer retaining receptacle, the washing unit and the curing/drying unit.

23. The stereolithography apparatus of claim 20, wherein the apparatus further comprises one or more shielded cabinets to house the washing unit and the curing/drying unit.

24. The stereolithography apparatus of claim 1, wherein the apparatus further comprises one or more alternative manufacturing apparatuses.

25. The stereolithography apparatus of claim 24, wherein the alternative manufacturing process apparatus is selected from the group consisting of: Computer Numerical Control (CNC) milling apparatuses and tool carousels, Coordinate Measuring Machine (CMM) probes and other vision measurement systems, Fused Deposition Modeling (FDM), Selective Laser Sintering (SLS), Layered Object Manufacturing (LOM) and other RP technologies, micro-machining systems, micro jet and other cutting systems such as water jet, laser and plasma cutting systems, painting apparatuses, ink jets and other fluid and particle dispensing mechanisms and/or other pick and place technologies including robotic materials placement technologies and any combination thereof.

26. The stereolithography apparatus of claim 24, wherein the apparatus further comprises one or more horizontal translation mechanisms adapted to access the polymer retaining receptacle, the washing unit and the alternative manufacturing apparatus.

27. The stereolithography apparatus of claim 24, wherein the apparatus further comprises one or more shielded cabinets to house one or more stereolithography apparatus components selected from the group consisting of the polymer retaining receptacle, the washing unit and the alternative manufacturing process apparatus.

28. The stereolithography apparatus of claim 1, wherein the apparatus further comprises one or more curing/drying units and one or more alternative manufacturing apparatuses.

29. The stereolithography apparatus of claim 28, wherein the apparatus further comprises one or more horizontal translation mechanisms adapted to access the polymer retaining receptacle, the washing unit, the curing/drying unit and the alternative manufacturing apparatus.

30. The stereolithography apparatus of claim 28, wherein the apparatus further comprises one or more shielded cabinets the polymer retaining receptacle, the washing unit, curing/drying unit and the alternative manufacturing process apparatus.

31. The stereolithography apparatus of claim 1, wherein the apparatus further comprises one or more recoating devices.

32. The stereolithography apparatus of claim 1, wherein the polymer retaining receptacle further comprises one or more main vat chamber and one or more overfill vat chamber.

* * * * *

UNITED STATES PATENT AND TRADEMARK OFFICE
CERTIFICATE OF CORRECTION

PATENT NO. : 7,556,490 B2  Page 1 of 1
APPLICATION NO. : 10/903379
DATED : July 7, 2009
INVENTOR(S) : Ryan Wicker et al.

It is certified that error appears in the above-identified patent and that said Letters Patent is hereby corrected as shown below:

In column 1, line 2, insert
--STATEMENT REGARDING FEDERALLY SPONSORED RESEARCH AND DEVELOPMENT This invention was made with government support under Contract DE-FC04-01AL67097 awarded by the U.S. Department of Energy. The government has certain rights in the invention.--.

Signed and Sealed this

Twenty-second Day of September, 2009

David J. Kappos
*Director of the United States Patent and Trademark Office*